(12) United States Patent
DeVries et al.

(10) Patent No.: US 7,739,044 B2
(45) Date of Patent: *Jun. 15, 2010

(54) METHOD OF COLLECTING INFORMATION FOR A GEOGRAPHIC DATABASE FOR USE WITH A NAVIGATION SYSTEM

(75) Inventors: Steven P. DeVries, Schererville, IN (US); James M. Herbst, Chicago, IL (US); Karen A. Hopkins, Chicago, IL (US); Suzanne M. McGrath, Chicago, IL (US); Ellen M. Bauer, Chicago, IL (US); James R. Bennett, San Jose, CA (US); Jason M. Borak, Algonquin, IL (US)

(73) Assignee: NAVTEQ North America, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/338,060

(22) Filed: Dec. 18, 2008

(65) Prior Publication Data
US 2009/0187339 A1 Jul. 23, 2009

Related U.S. Application Data

(63) Continuation of application No. 11/789,869, filed on Apr. 26, 2007, now Pat. No. 7,487,041, which is a continuation of application No. 11/583,454, filed on Oct. 19, 2006, now Pat. No. 7,248,966, which is a continuation of application No. 10/881,310, filed on Jun. 30, 2004, now Pat. No. 7,149,626.

(51) Int. Cl.
*G01C 21/30* (2006.01)

(52) U.S. Cl. ............... 701/211; 701/25; 701/208; 701/209

(58) Field of Classification Search .............. 701/23, 701/25, 202, 206, 208, 209, 211, 212; 342/357.13; 340/995.24
See application file for complete search history.

(56) References Cited

U.S. PATENT DOCUMENTS

| 6,018,697 | A | 1/2000 | Morimoto et al. ......... 701/209 |
| 6,119,065 | A | 9/2000 | Shimada et al. ............ 701/201 |
| 6,199,013 | B1 | 3/2001 | O'Shea ........................ 701/211 |
| 6,321,161 | B1 | 11/2001 | Herbst et al. ................. 701/210 |
| 6,339,746 | B1 | 1/2002 | Sugiyama et al. .......... 701/209 |
| 6,356,837 | B1 | 3/2002 | Yokota et al. .............. 701/208 |
| 6,374,182 | B2 | 4/2002 | Bechtolsheim et al. ..... 701/209 |
| 6,405,128 | B1 | 6/2002 | Bechtolsheim et al. ..... 701/208 |

(Continued)

FOREIGN PATENT DOCUMENTS

EP 1030167 8/2000

(Continued)

*Primary Examiner*—Gertrude Arthur Jeanglaud
(74) *Attorney, Agent, or Firm*—Jon D. Shutter; Frank J. Kozak; Lisa M. Schoedel

(57) ABSTRACT

A method for collecting geographic data identifies a pedestrian segment associated with a path. Location information for the pedestrian segment is collected. Additionally, lighting level attribute information is collected for the pedestrian segment. The location information and the lighting level attribute information are stored in the geographic database that is stored on a computer readable storage medium.

20 Claims, 26 Drawing Sheets

U.S. PATENT DOCUMENTS

| | | |
|---|---|---|
| 6,442,478 B2 | 8/2002 | Hamada et al. ............. 701/209 |
| 6,490,522 B2 | 12/2002 | Sugiyama et al. ........... 701/211 |
| 6,510,379 B1 | 1/2003 | Hasegawa et al. .......... 701/202 |
| 6,526,350 B2 | 2/2003 | Sekiyama ................... 701/209 |
| 6,542,811 B2 | 4/2003 | Doi ............................ 701/200 |
| 6,577,950 B2 | 6/2003 | Shimazu ..................... 701/211 |
| 6,594,581 B2 | 7/2003 | Matsuda et al. ............. 701/211 |
| 6,622,089 B2 | 9/2003 | Hasegawa et al. .......... 701/211 |
| 6,728,636 B2 | 4/2004 | Kokojima et al. ........... 701/211 |
| 6,735,515 B2 | 5/2004 | Bechtolsheim et al. ...... 701/208 |
| 6,751,549 B1 | 6/2004 | Kozak ........................ 701/209 |
| 6,766,245 B2 | 7/2004 | Padmanabhan ............. 701/207 |
| 6,922,630 B2 | 7/2005 | Maruyama et al. .......... 701/200 |
| 7,149,626 B1 | 12/2006 | Devries et al. .............. 701/211 |
| 7,266,447 B2 | 9/2007 | Bauer et al. ................. 701/208 |
| 7,487,041 B2 * | 2/2009 | Devries et al. .............. 701/211 |
| 2002/0120397 A1 | 8/2002 | Kepler ........................ 701/209 |
| 2002/0120398 A1 | 8/2002 | Matsuda et al. ............. 701/211 |
| 2003/0158650 A1 | 8/2003 | Abe et al. ................... 701/200 |
| 2003/0176965 A1 | 9/2003 | Padmanabhan ............. 701/207 |
| 2004/0122591 A1 | 6/2004 | MacPhail .................... 701/209 |
| 2004/0220730 A1 | 11/2004 | Chen et al. .................. 701/210 |

FOREIGN PATENT DOCUMENTS

| | | |
|---|---|---|
| EP | 1160694 | 5/2001 |
| EP | 1305783 | 11/2004 |

* cited by examiner

1100 →

| Seg Type | Seg ID | Ref Node ID | Non Ref Node ID | Phrase ID | Name | After Me | Do Not Explicate Ref Node | Do Not Explicate Non Ref Node | Angle In | Angle Out | Applicable in the From Ref Node Dir | Applicable in the To Ref Node Dir |
|---|---|---|---|---|---|---|---|---|---|---|---|---|
| 1102 | 1104 | 1106 | 1108 | 1110 | 1112 | 1114 | 1116 | 1118 | 1120 | 1122 | 1124 | 1126 |
| 996 | M | 15 | 1 | 0 | after the cul de sac, walk down the stairs | N | N | N | 0 | 0 | Y | N |
| 996 | M | 15 | 1 | 6 | the stairs | N | N | N | 0 | 0 | N | Y |
| 996 | A | 14 | 1 | 2 | the tunnel | Y | N | N | 2 | 0 | N | N |
| 996 | B/C | 14 | 4 | 0 | walk 20 yards and cross the bicycle path | N | N | N | 4 | 1 | N | N |
| 996 | D | 3 | 5 | 4 | Lake Michigan | N | N | N | 3 | 7 | N | N |
| 996 | E | 5 | 6 | 8 | the bridge | Y | N | N | 0 | 0 | N | N |
| 996 | G | 7 | 8 | 10 | parking lot | N | Y | Y | 1 | 0 | N | N |
| 996 | I | 9 | 10 | 6 | the hill | N | N | N | 4 | 1 | Y | N |
| 996 | I | 9 | 10 | 7 | the hill | N | N | N | 5 | 2 | N | Y |
| 996 | K | 12 | 11 | 4 | the zoo fence | N | N | N | 0 | 0 | Y | N |
| 996 | K | 12 | 11 | 11 | the zoo fence | N | N | N | 0 | 0 | N | Y |

| ID 1202 | Lat 1204 | Long 1206 | Name 1208 | Calculate Angle? 1210 | At Explication 1212 | Connection 1214 |
|---|---|---|---|---|---|---|
| 15 | | | the end of North Ave | Y | Y | 735 |
| 1 | | | the tunnel | Y | N | N/A |
| 14 | | | the tunnel | Y | N | N/A |
| 4 | | | the beach | Y | Y | N/A |
| 3 | | | the Boat House | Y | Y | N/A |
| 5 | | | the pedestrian bridge | Y | N | N/A |
| 6 | | | the pedestrian bridge | N | N | N/A |
| 7 | | | the end of the parking lot | Y | Y | N/A |
| 8 | | | the parking lot | Y | Y | N/A |
| 9 | | | the volleyball courts | Y | Y | N/A |
| 10 | | | the statue of a man on a horse | Y | Y | N/A |
| 11 | | | the zoo fence | Y | N | N/A |
| 12 | | | the bridge | Y | Y | N/A |
| 13 | | | the scenic view point | Y | N | N/A |
| 17 | | | Café Brauer | Y | Y | N/A |
| 18 | | | | | | |
| 19 | | | the Zoo | Y | Y | N/A |
| 20 | | | the bridge | Y | N | N/A |
| 21 | | | the bridge | Y | N | N/A |

Fig. 12

Example 1:

Previous Pedestrian Segment
  After Me = N

Current Orientation Node
  At Explication = Y
  Node Name = "the statue"
  Calculate Angle = Y

Current Pedestrian Segment
  Phrase ID = 10 ("along")
  Segment Name = "the brick path"
  Do Not Explicate Ref Pt = N

Next Orientation Node
  Node Name = "the pond"

Pedestrian Guidance Message:
"At the statue, turn right and walk along the brick path toward the pond."

FIG. 17A

Example 2:

Previous Pedestrian Segment
    After Me = N

Current Orientation Node
    At Explication = Y
    Node Name = "the fountain"
    Calculate Angle = N

Current Pedestrian Segment
    Phrase ID = 4 ("keeping <blank> on your right"
    Segment Name = "the kayaking course"
    Do Not Explicate Ref Pt = Y

Next Orientation Node
    Node Name = "the kayaking course"

Pedestrian Guidance Message:
"At the fountain, walk keeping the kayaking course on your right."

METHOD OF COLLECTING INFORMATION FOR A GEOGRAPHIC DATABASE FOR USE WITH A NAVIGATION SYSTEM

REFERENCE TO RELATED APPLICATIONS

The present application is a continuation of application Ser. No. 11/789,869 filed Apr. 26, 2007 now U.S. Pat. No. 7,487,041, which was a continuation of application Ser. No. 11/583,454, now U.S. Pat. No. 7,248,966 filed Oct. 19, 2006, which was a continuation of application Ser. No. 10/881,310, now U.S. Pat. No. 7,149,626 filed Jun. 30, 2004, which was related to the co-pending applications: application Ser. No. 10/881,312 filed on Jun. 30, 2004 now U.S. Pat. No. 7,266,447; application Ser. No. 10/881,660 filed on Jun. 30, 2004, application Ser. No. 10/880,660 filed on Jun. 30, 2004, now U.S. Pat. No. 7,421,341; application Ser. No. 10/880,815 filed on Jun. 30, 2004, now U.S. Pat. No. 7,460,953; and application Ser. No. 10/880,816 filed on Jun. 30, 2004, the entire disclosures of which are incorporated by reference herein.

BACKGROUND OF THE INVENTION

The present invention relates to a method and system for collecting information for a geographic database, and more particularly to a method and system for collecting pedestrian-related information for a geographic database.

Vehicle navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route. The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as the positions of the roads, speed limits along portions of roads, address ranges along the road portions, turn restrictions at intersections of roads, direction restrictions, such as one-way streets, and so on. Additionally, the geographic data may include points of interest, such as restaurants, hotels, airports, gas stations, stadiums, police stations, and so on.

Although navigation systems provide many important features, there continues to be room for new features and improvements. One area in which there is room for improvement relates to determining a route for a pedestrian and to providing guidance to the pedestrian following the route. Pedestrian routes and guidance provides challenges not associated with vehicle guidance. Pedestrians are not limited to travel only on the road network; rather, pedestrians may walk through public spaces, such as plazas and parks, having no associated road network. Additionally, pedestrians do not have direction restrictions as a vehicle; pedestrians can walk down a one-way street in both directions. Moreover, pedestrians have a greater degree of freedom of motion and may become more frequently confused as to their orientation to destination.

Accordingly, it would be beneficial to have an improved way to guide users of a navigation system.

SUMMARY OF THE INVENTION

To address these and other objectives, the present invention comprises a method for operating a navigation system. The method obtains an ordered plurality of interconnected segments providing a route from an origin to a destination. The method forms a guidance message for each of the segments. The step of forming the guidance message comprises determining whether to reference a previous segment and adding a reference to a current segment.

Another aspect of the present invention is a navigation system comprising a route guidance application that provides a guidance message for each segment of a route between an origin and a destination. The guidance message comprises a reference to a previous segment and a reference to a current segment.

BRIEF DESCRIPTION OF THE DRAWINGS

An exemplary embodiment of the present invention is described herein with reference to the following drawings.

FIG. 11 is a table of pedestrian segment data records in the geographic database, according to an exemplary embodiment.

FIG. 12 is a table of orientation node data records in the geographic database, according to an exemplary embodiment.

FIGS. 17A and 17B provide examples of creating pedestrian guidance messages, according to an exemplary embodiment.

DETAILED DESCRIPTION OF THE PRESENTLY PREFERRED EMBODIMENTS

I. Navigation System

Figure 1:
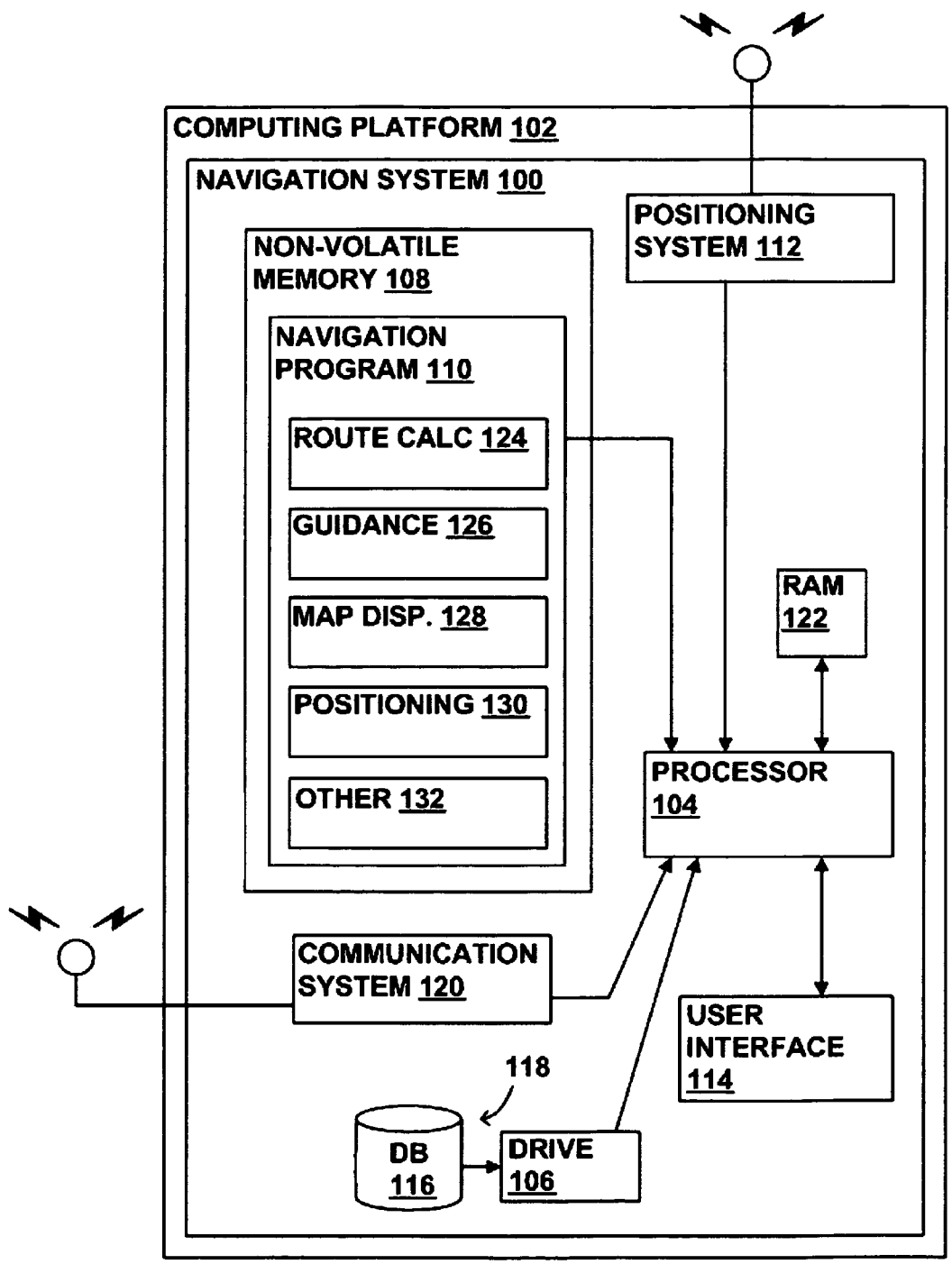
FIG. 1 is a block diagram of a navigation system, according to an exemplary embodiment.

FIG. 1 is a block diagram of a navigation system 100 associated with a computing platform 102, such as a personal digital assistant (PDA), mobile telephone or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The input information may include a request for navigation features and functions of the navigation system 100. To provide navigation features and functions, the navigation system 100 uses a geographic database 116 stored on a storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128, and positioning 130 (e.g., map matching).

Other functions and programming 132 may be included in the navigation system 100. The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
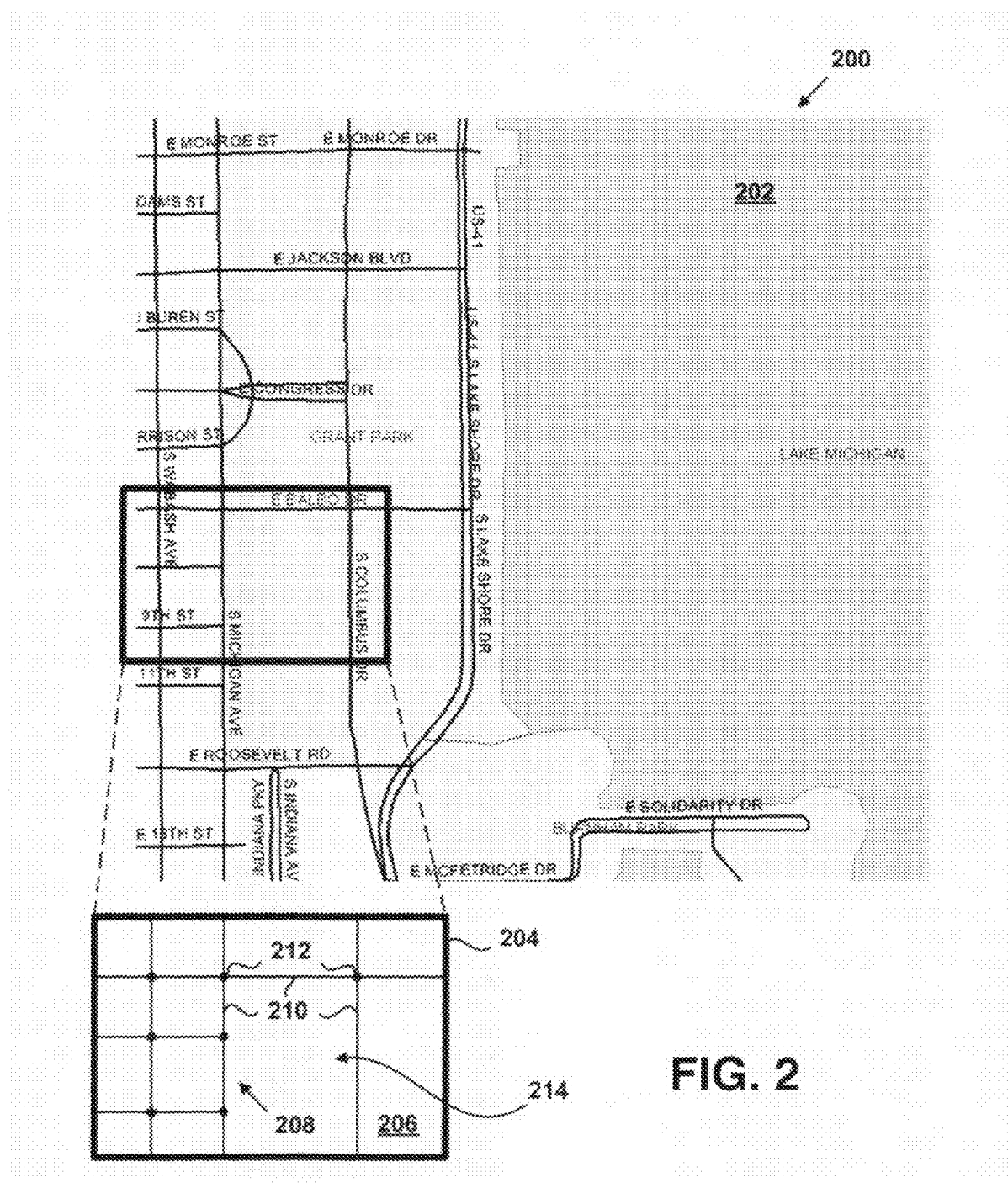
FIG. 2 illustrates a map of a geographic region.

In order to provide navigation-related features and functions to the end user, the navigation system 100 uses the geographic database 116. The geographic database 116 includes information about one or more geographic regions. FIG. 2 illustrates a map 200 of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 also includes an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead-ends.

Figure 3:
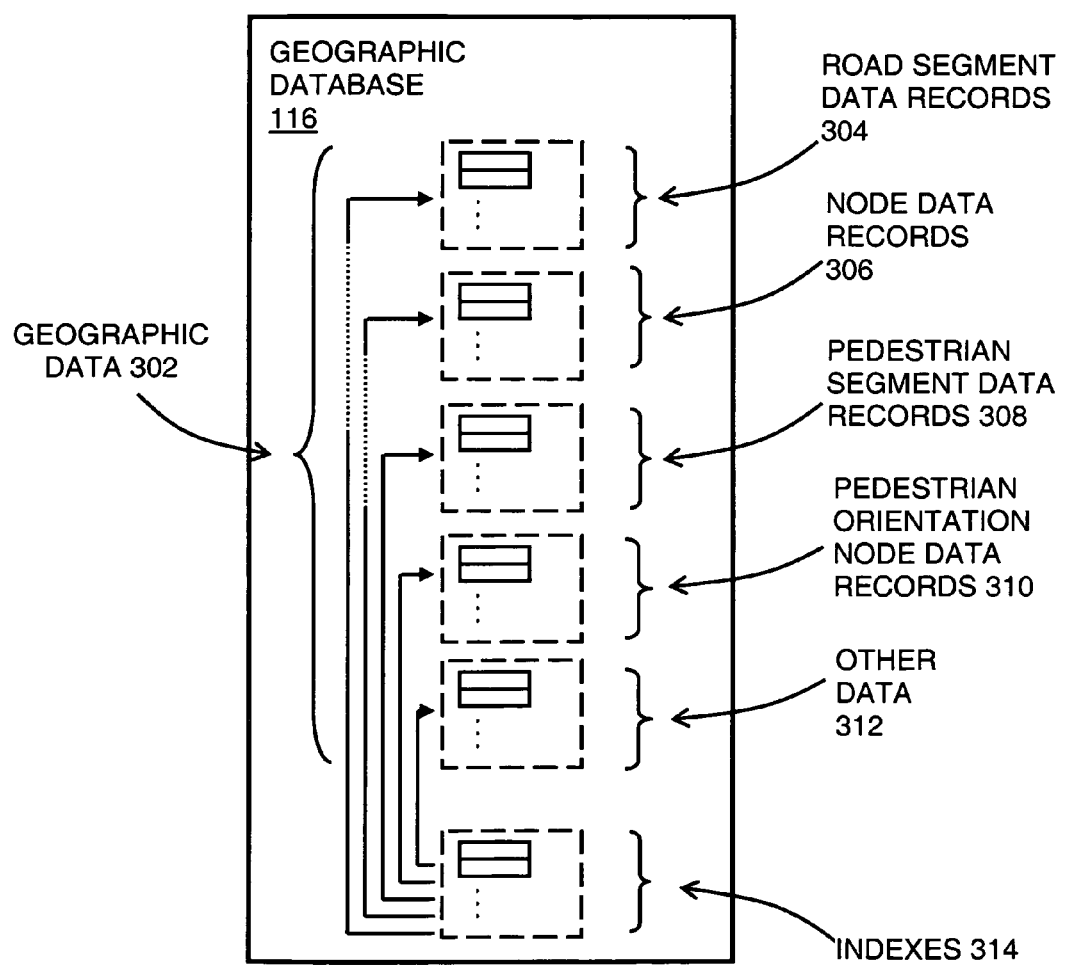
FIG. 3 is a block diagram of a geographic database included in the navigation system depicted in FIG. 1, according to an exemplary embodiment.

Referring to FIG. 3, the geographic database 116 contains data 302 that represents some of the physical geographic features in the geographic region 202 depicted in FIG. 2. The data 302 contained in the geographic database 116 includes data that represent the road network 208. In the embodiment of FIG. 3, the geographic database 116 that represents the geographic region 202 contains at least one road segment database record 304 (also referred to as "entity" or "entry") for each road segment 210 in the geographic region 202. The geographic database 116 that represents the geographic region 202 also includes a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 116 may also include other kinds of data 312. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The geographic database 116 also includes indexes 314. The indexes 314 may include various types of indexes that relate the different types of data to each other or that relate to other aspects of the data contained in the geographic database 116. For example, the indexes 314 may relate the nodes in the node data records 306 with the end points of a road segment in the road segment data records 304. As another example, the indexes 314 may relate point of interest data in the other data records 312 with a road segment in the segment data records 304.

Figure 4:
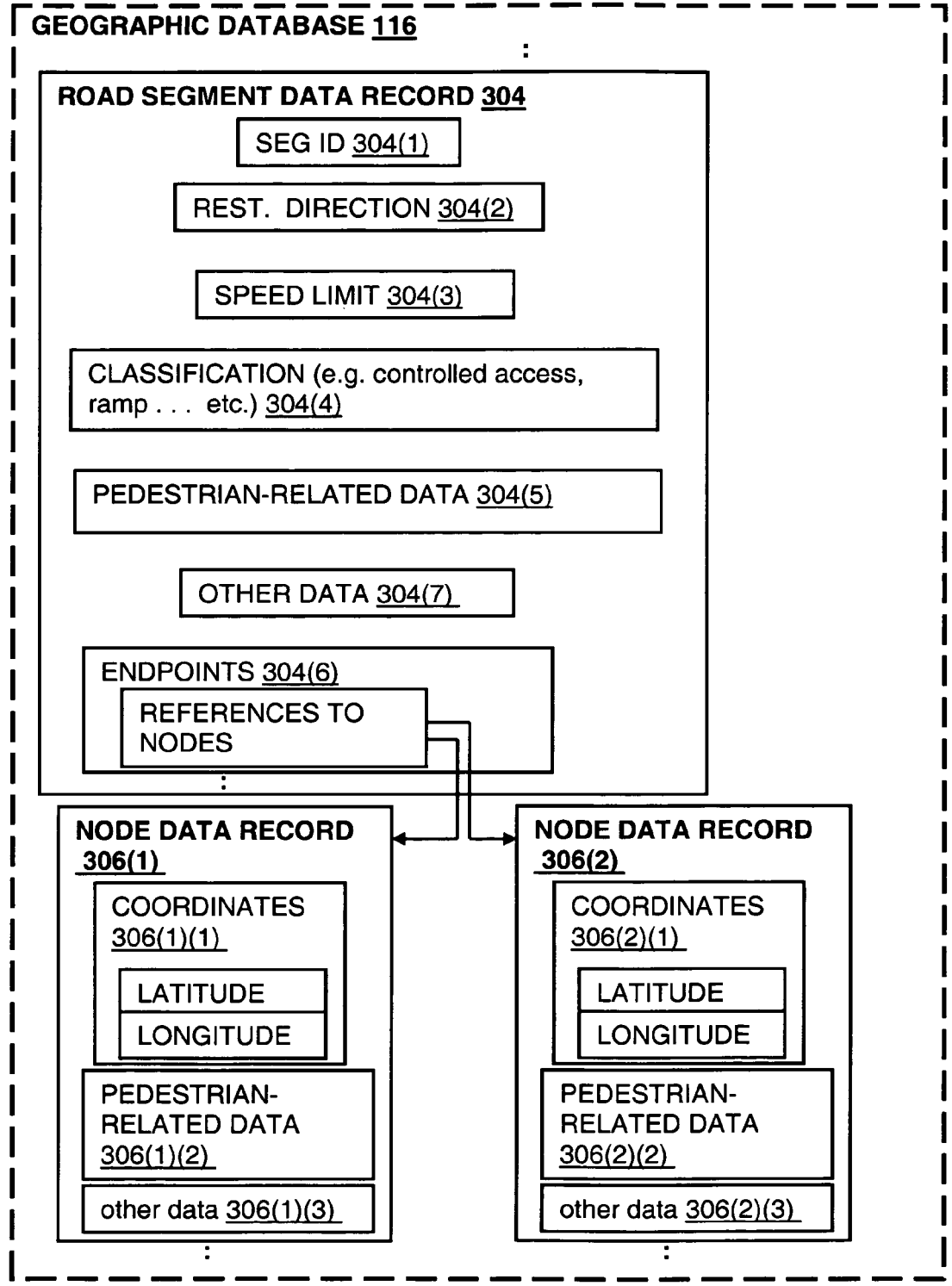
FIG. 4 is a block diagram of components of data records contained in the geographic database depicted in FIG. 3, according to an exemplary embodiment.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 includes data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on.

The road segment data record 304 also includes data 304(6) providing the geographic coordinates (e.g., the latitude and longitude) of the end points of the represented road segment. In one embodiment, the data 304(6) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 4 also shows some of the components of a node data record 306 contained in the geographic database 116. Each of the node data records 306 may have associated information (such as "attributes", "fields", etc.) that allows identification of the road segment(s) that connect to it and/or it's geographic position (e.g., its latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

III. Collecting Pedestrian Data

Referring to FIG. 2, the enlarged portion 206 of the illustrated geographic region 202 includes a portion of the road network 208 and a portion of a park 214. In one embodiment, the navigation system 100 provides navigation-related features and functions to a user operating a motor vehicle, such as a truck, car or motorcycle. For this embodiment, the navigation system 100 utilizes data representing the road network 208 in the geographic database 116 to provide navigation-related features and functions, such as route calculation and route guidance. For example, the route calculation application provides a continuous navigable route from the origin to the destination as an order list identifying a plurality of road segment data entities. The route guidance application provides maneuvering instructions along the road network to follow the calculated route.

In another embodiment, the navigation system 100 provides navigation-related features and functions to a user that is not operating a motor vehicle, such as a pedestrian. For this example, the pedestrian is not limited to travel only on the road network 208. Rather, the pedestrian may walk through public plazas and parks having no associated road network. Additionally, the pedestrian does not have direction restrictions as a vehicle; the pedestrian can walk down a one-way street in both directions. Moreover, the pedestrian has a greater degree of freedom of motion and may become more frequently confused as to their orientation.

Figure 5:
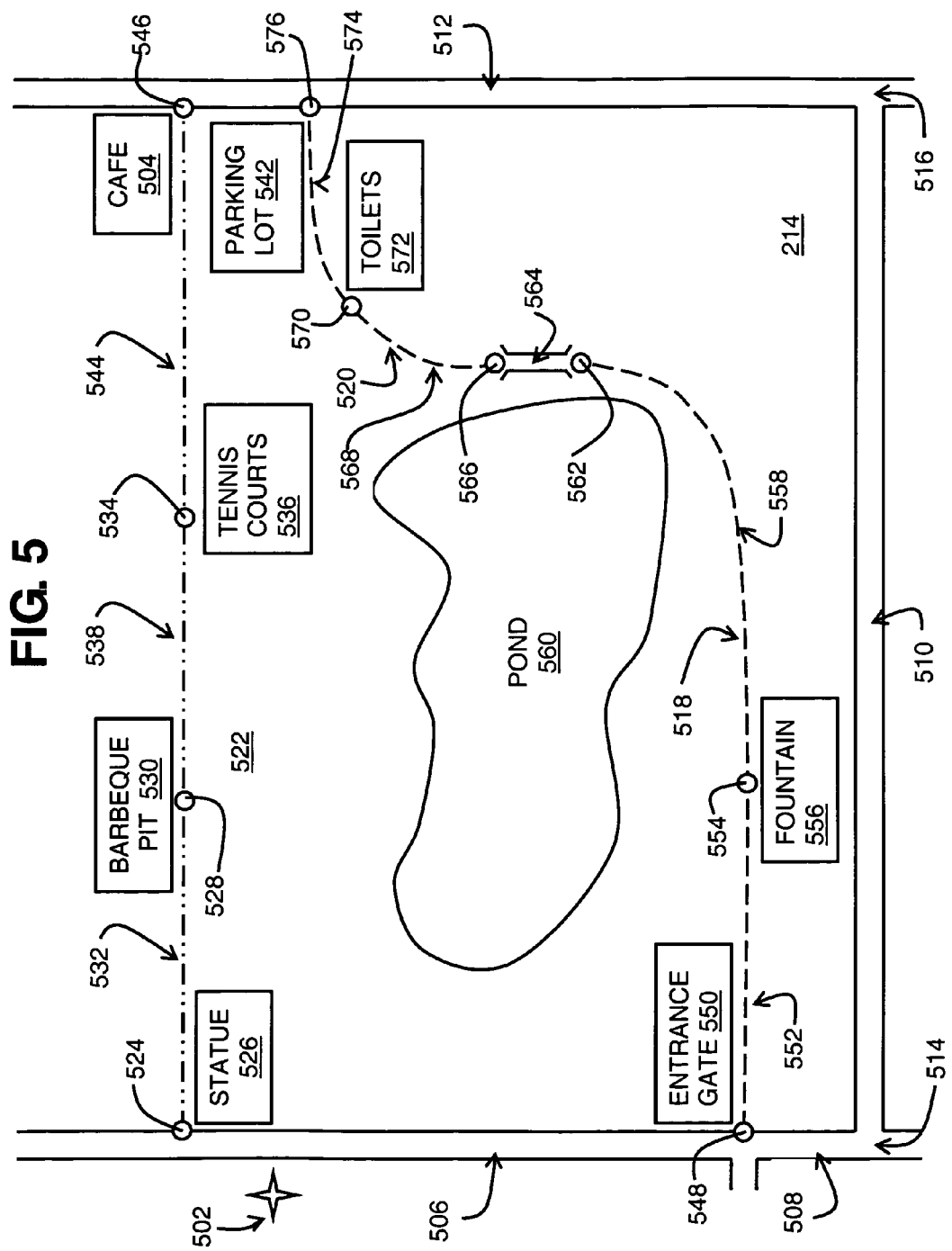
FIG. 5 is a representation of a portion of the geographic region depicted in FIG. 2, according to an exemplary embodiment.

FIG. 5 illustrates a portion of a park 214 in the geographic region 202 of FIG. 2. Suppose the pedestrian requests a route from the navigation system 100 from his or her current position 502 to a cafe 504. If the navigation system 100 calculated the route using only the road network 208, the route to the cafe 504 would comprise consecutive road segments 506, 508, 510 and 512 with left turn maneuvers at nodes 514 and 516. However, since the pedestrian can walk through the park, a more direct and shorter route is possible. To allow the navigation system 100 to provide improved pedestrian routes, a geographic database developer collects information relating to the geographic features of the geographic region useful for providing pedestrians and other users with navigation-related features and functions. In one embodiment, a geographic researcher travels the geographic region to collect information relating to geographic features useful for providing pedestrians with navigation-related features and functions (hereinafter "pedestrian data"). In another embodiment, the geographic researcher uses aerial images to collect pedestrian data.

A. Collecting Pedestrian Data for Unorganized Geographic Areas

An unorganized geographic area is a geographic area that lacks underlying organization into paths or roads. That is, the unorganized geographic area does not contain path or road geometry marked by paving, contrasting ground cover, such as a dirt trail through a grassy meadow, or paint trails over concrete. For example, the park illustrated in FIG. 5, includes established paths 518 and 520, paved or unpaved; however, the park also includes an unorganized portion 522 over which the pedestrian may walk without any paths, such as over grassy areas.

Figure 6:
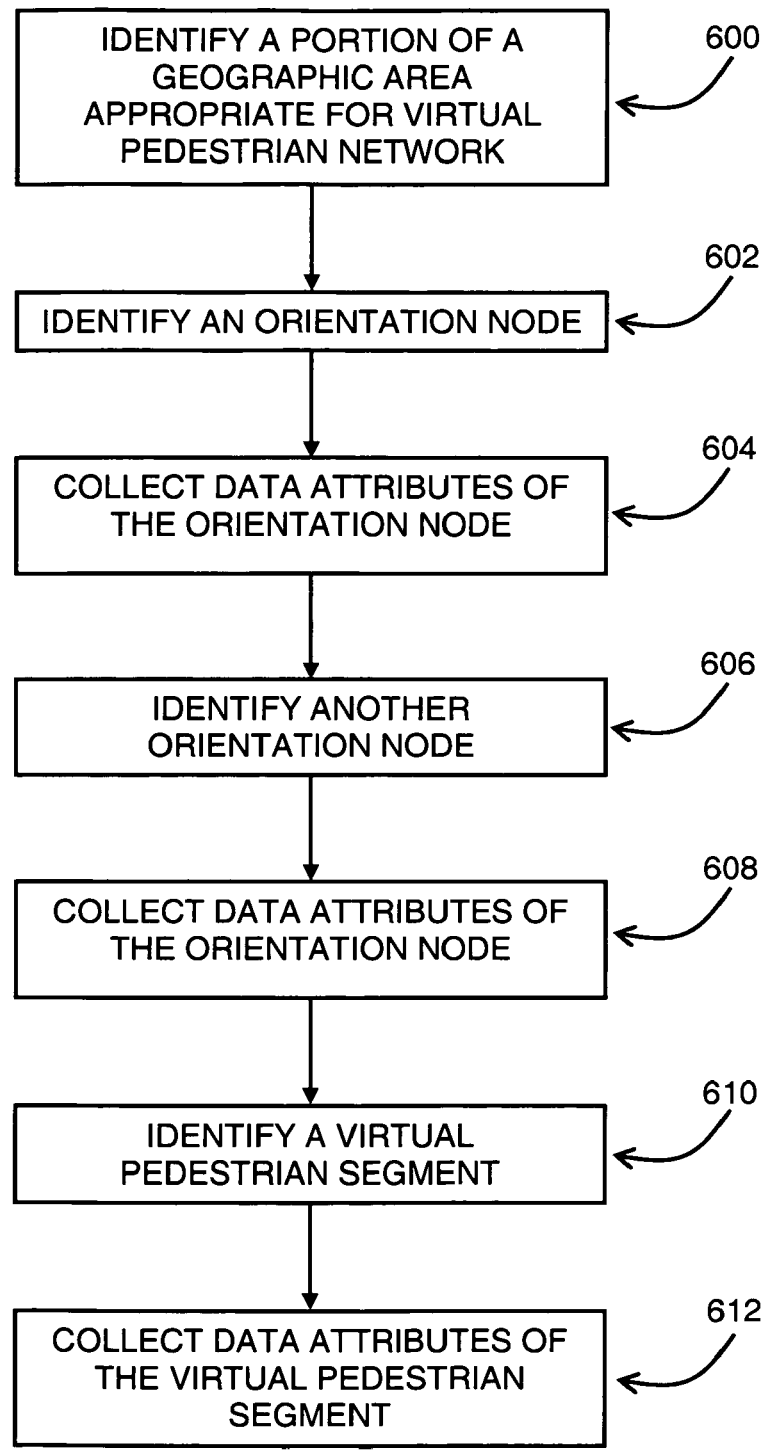
FIG. 6 is a flow chart for collecting pedestrian information for unorganized geographic areas, according to an exemplary embodiment.

FIG. 6 is a flow chart 600 for collecting pedestrian data for unorganized geographic areas, according to an exemplary embodiment. The steps of FIG. 6 will be illustrated using the unorganized geographic area 522 of the park 214 of FIG. 5. At step 600, the geographic researcher identifies a portion of the unorganized geographic area appropriate for a virtual pedestrian network. The virtual pedestrian network is similar to the road network 208. Whereas the road network 208 comprises of road segments and nodes, the virtual pedestrian network comprises virtual pedestrian segments and orientation nodes. Whereas a vehicle may be routed and guided from an origin to a destination over the road network 208, a pedestrian or other user may be routed and guided from an origin to a destination over, in part or entirely, the virtual pedestrian network which traverses unorganized geographic area lacking the road network or established paths. In one embodiment, the geographic researcher identifies a portion of the unorganized geographic area appropriate for a virtual pedestrian network by determining that pedestrians may readily traverse the unorganized geographic area, that pedestrians may reduce their travel distance and/or travel time by traversing the unorganized geographic area and/or that pedestrians may desire to be routed and guided to a feature or point of interest within the unorganized geographic area.

Once the geographic researcher has identified a portion of the unorganized geographic area appropriate for the virtual pedestrian network, the geographic researcher identifies a series of interconnected virtual pedestrian segments and associated orientation nodes. Each virtual pedestrian segment is associated with two orientation nodes; one orientation node represents one end of the virtual pedestrian segment and the other orientation node represents the other end of the virtual pedestrian segment. The orientation node at either end of the virtual pedestrian segment may correspond to a location at which the virtual pedestrian segment meets another virtual pedestrian segment, where the virtual pedestrian segment meets a road segment, where the virtual pedestrian segment meets a pedestrian segment associated with a path of an organized geographic area, at a point of interest or where the virtual pedestrian segment dead-ends.

Referring to FIG. 6, at step 602, the geographic researcher identifies an orientation node. The location of the orientation node is selected at a location that may be readily described to provide orientation to the pedestrian. In one embodiment, the orientation node is selected at a location that may be visually identified by the pedestrian. For the exemplary embodiment illustrated in FIG. 5, an orientation node 524 is located near a statue 526. The statue 526 is a prominent feature readily visually observed by the pedestrian. Additionally, a clear and concise description of the statue 526, such as statue of a man on a horse, provides orientation to the pedestrian.

At step 604, the researcher collects attribute information of the orientation node. Attribute information includes descriptive words characterizing the location of the orientation node and any surrounding features, such as statue of a man on a horse, for orientation node 524. The attribute information also may include a latitude and longitude position of the orientation node. A positioning system may be used to determine the latitude and longitude position of the orientation node. The position system may utilize GPS-type technology, a dead reckoning-type system, or combinations of these or other systems, all of which are known in the art. The positioning system may include suitable sensing devices to obtain a GPS signal and to measure the traveling distance speed, direction, and so on, of the system. Alternatively, aerial images of the area may be used to determine the position of the orientation node.

Other attribute information of the orientation node that may be collected include: wheel chair accessible, children friendly, pet friendly, well-lighted area, poorly lighted area, busy area, non-busy area, noisy/peaceful, smelly/polluted, sheltered from rain, not sheltered from rain, no bikes allowed, tree lined, paved area, unpaved area, grassy area, gravel area, dirt area, muddy when wet area, and any other attribute information. The geographic researcher may record the attribute information using any data collection method, such as handwriting, voice recording, and data entry into a user device. In one embodiment, the researcher may capture an image of the orientation node including the surrounding area with a digital camera. Furthermore, the researcher may collect guidance information as discussed below in conjunction with FIG. 8 for the orientation node.

In one embodiment, the researcher collects connection information indicating whether the orientation node is in close proximity to the road network 208. If the orientation node is close to the road network 208, the researcher identifies the road node close to the orientation node. In another embodiment, the researcher may identify a road segment for connection information. The researcher may record the connection information in the form of a street address, name or ID of a road segment or road node, a distance from a node along an identified road segment, intersection of two identified road segments, a point of interest or in any other appropriate form. For the example depicted in FIG. 5, the researcher records connection information identifying that orientation node 524 connects with road segment 506. If the orientation node is not close to the road network, the researcher records such an indication.

At step 606, the geographic researcher identifies another orientation node. The second orientation node 528 is selected at another location that may be readily described to provide orientation to the pedestrian. Additionally, the second orientation node is selected at a location in which the pedestrian may be directed from the first orientation node location to the second orientation node location. In one embodiment, the second orientation node is selected at a distance from the first orientation node such that the pedestrian may visually identify the location of the second orientation node from the location of the first orientation node. In another embodiment, the second orientation node location may be obscured from view or beyond visual identification from the first orientation node location. For example, the pedestrian may be directed to walk in a certain direction, such as toward a lake, and after walking some distance, the second orientation node comes into view.

For the exemplary embodiment illustrated in FIG. 5, a second orientation node 528 is located near a barbeque pit 530. The barbeque pit 530 is a prominent feature readily visually observed by the pedestrian. Additionally, a clear and concise description of the barbeque pit 530, such as a stone barbeque pit with pizza oven feature, provides orientation to the pedestrian. At step 608, the researcher collects attribute information of the orientation node in the similar manner as discussed above for the first orientation node 524.

At step 610, the researcher identifies a virtual pedestrian segment 532. The virtual pedestrian segment 532 is an artificially created segment over the unorganized portion 522 on which the pedestrian may walk from the first orientation node 524 to the second orientation node 528. When identifying the virtual pedestrian segments, the geographic researcher insures that the pedestrian may walk unobstructed from the first to the second orientation node. For example, the geographic researcher would not identify a virtual pedestrian segment that goes over a cliff.

At step 612, the researcher collects attribute information of the virtual pedestrian segment. Attribute information includes descriptive words characterizing the virtual pedestrian segment and any surrounding features. For example, virtual pedestrian segment 532 may be described as "keeping the pond on your right/left." The attribute information may also include a distance or length of the virtual pedestrian segment, such as 50 meters, or an estimated travel time to walk the virtual pedestrian segment. Other attribute information of the virtual pedestrian segment that may be collected include: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, hilly, steps, rough terrain, grade, and any other attribute information. Additionally, the researcher may collect information relating to points of interest proximate the virtual pedestrian segment including location of bike racks, water fountains, toilets, historic sites, recreational facilities, entrances to points of interest or any other information. Additionally, the researcher may collect position data along the virtual pedestrian segment to be used as shape points for cartographically representing the virtual pedestrian segment. In one embodiment, the researcher may capture an image of the virtual pedestrian segment including the surrounding area with a digital camera. Furthermore, the researcher may collect guidance information as discussed below in conjunction with FIG. 8 for the virtual pedestrian segment.

Referring to FIG. 5, the researcher continues to identify orientation nodes and virtual pedestrian segments for the unorganized area 522. For example, another orientation node 534 is identified near tennis courts 536, and another virtual pedestrian segment 538 connects orientation node 528 with orientation node 534. Yet another orientation node 540 is identified near the cafe 504 and a parking lot 542, and another virtual pedestrian segment 544 connects orientation node 534 with orientation node 540.

In alternative embodiments, the steps for collecting pedestrian data for unorganized geographic areas are performed in a different order than presented in FIG. 6. In another embodiment, the researcher identifies a first orientation node, identifies a virtual pedestrian segment from the first orientation node and then identifies a second orientation node completing the virtual pedestrian segment. In yet another embodiment, the researcher identifies virtual pedestrian segments and then identifies orientation nodes along the virtual pedestrian segments. For example, the researcher collects pedestrian data for a scenic walk along a lakefront by first identifying virtual pedestrian segments along the lakefront and then identifying orientation nodes between the virtual pedestrian segments.

Figure 7A:
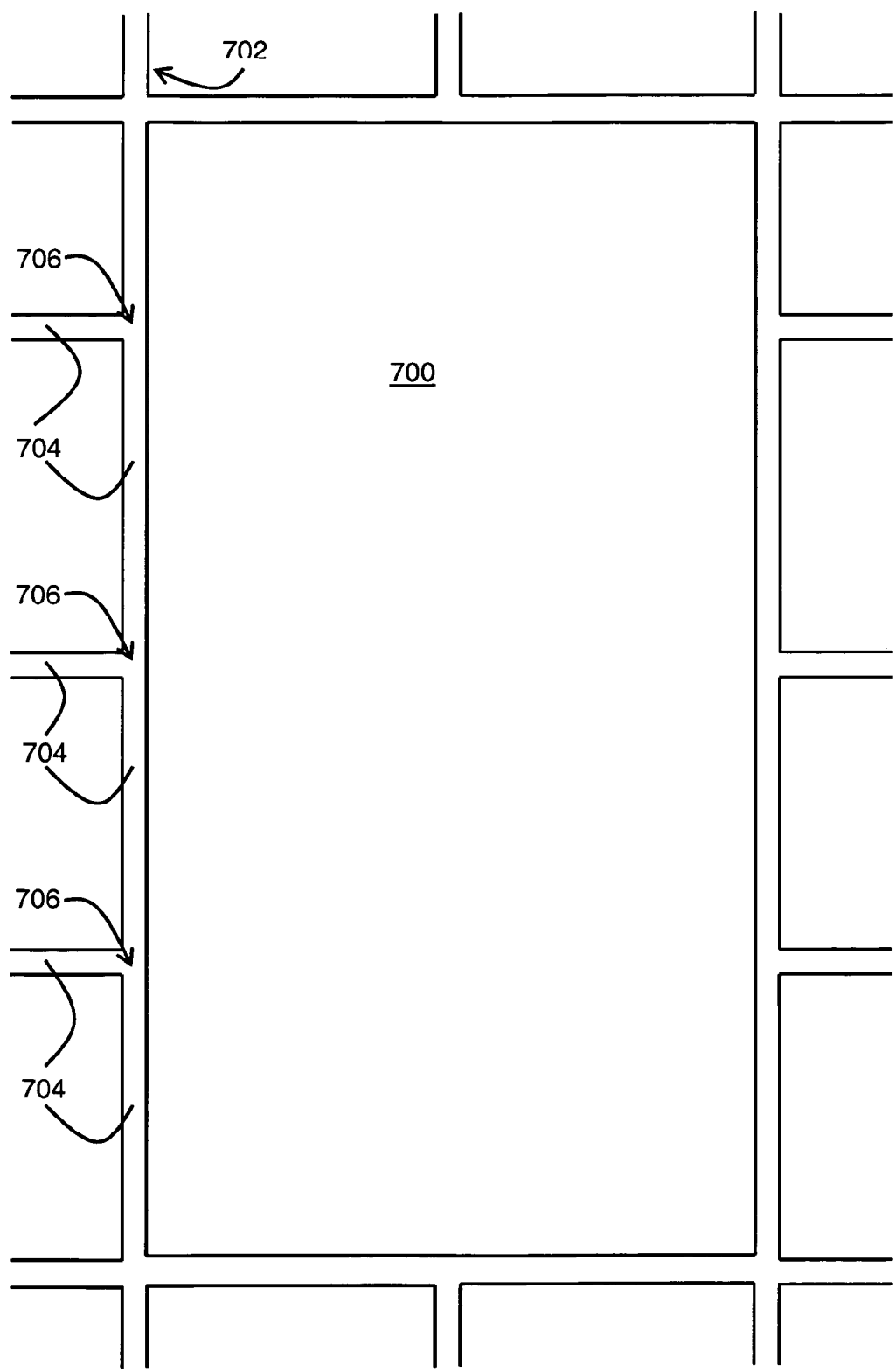
FIG. 7A is a representation of a plaza.

FIG. 7A illustrates another unorganized geographic area 700. The unorganized area 700 is a plaza in a city center. A portion of the road network 702 comprising several road segments 704 and nodes 706 surrounds the plaza 700. The plaza may be paved but lacks underlying organization into paths, such as paths provided by paint markings or paths marked by contrasting paving bricks. Despite the lack of organization into paths, the pedestrian is free to walk through the plaza. In one embodiment, the researcher collects pedestrian data for the plaza 700 in a similar manner as described above in conjunction with FIG. 6. For the exemplary embodiment of FIG. 7A, the researcher identifies the unorganized geographic area 700 of the plaza as appropriate for a virtual pedestrian network because pedestrians may readily traverse the plaza 700 and pedestrians may reduce their travel distance and/or travel time by traversing the plaza 700.

Figure 7B:
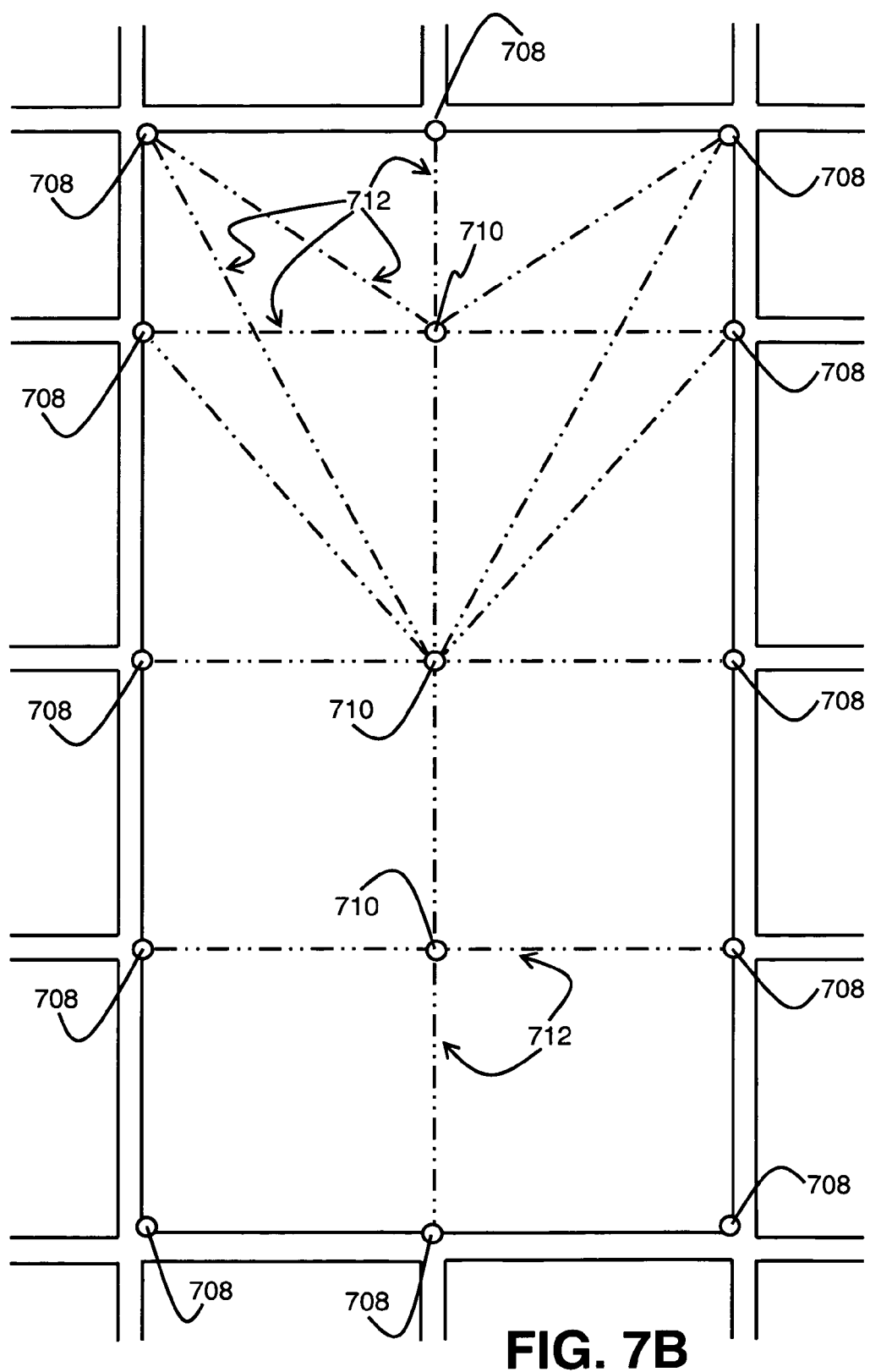
FIG. 7B is a representation of the plaza of FIG. 7A containing virtual pedestrian segments, according to an exemplary embodiment.

To collect the pedestrian data, the researcher identifies orientation nodes 708 in close proximity to the road network nodes 706 associated with intersecting road segments 702 that bound the plaza 700. FIG. 7B illustrates orientation nodes 708 in close proximity to the road nodes 706 of the intersections bounding the plaza 700. The researcher also collects attribute information for each of the orientation nodes 708. The attribute information includes words characterizing the location of the orientation node and any surrounding features, such as the street names of the corresponding intersection, a street address, description of prominent building, prominent signage or point of interest adjacent the orientation node. Additionally, the collected attribute information may include a latitude and longitude position. Other information of the orientation node may be collected including wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, shaded, shopping zone, curb cutouts, crosswalks and any other attribute information. In one embodiment, the researcher may capture an image of the orientation nodes including their respective surrounding areas with a digital camera.

For the exemplary embodiment of FIGS. 7A and 7B, the researcher also identifies orientation nodes within the center of plaza 700. The researcher identifies orientation nodes 710 at the center portions of the plaza 700. The researcher also collects attribute information for each of the orientation nodes 710. The attribute information includes words characterizing the location of the orientation node and any surrounding features, such as band pavilion, large fountain, statue of bald man, prominent buildings or any other feature. Additionally, the collected attribute information may include a latitude and longitude position and other information as discussed above for orientation nodes 708.

For the exemplary embodiment of FIGS. 7A and 7B, the researcher also identifies virtual pedestrian segments 712 between the identified orientation nodes 708 and 710 within the plaza 700. The researcher identifies the virtual pedestrian segments connecting two of the orientation nodes 708 and 710. A virtual pedestrian segment may be established between each of the orientation nodes; however, the researcher may decide to establish virtual pedestrian segments between only certain orientation nodes because the path between some of the orientation nodes may be blocked, such as by seasonal cafe seating. The researcher also collects attribute information for each of the virtual pedestrian segments 712. The attribute information includes descriptive words characterizing the virtual pedestrian segment and any surrounding features. Additionally, the collected attribute information may include an approximate length of the virtual pedestrian segment, or any other attribute information as discussed above. In one embodiment, the researcher may capture an image of the virtual pedestrian segments including their surrounding areas with a digital camera. Referring to FIG. 7B, after the researcher has identified orientation nodes 708 and 710 and the virtual pedestrian segments 712, the virtual pedestrian network provides navigatable geometry over which the pedestrian may be routed and guided.

B. Collecting Pedestrian Data for Organized Geographic Areas

An organized geographic area is a geographic area that has underlying organization into paths and roads. For example, the park illustrated in FIG. 5, includes established paths 518 and 520, paved or unpaved. The geographic researcher collects pedestrian data to provide a pedestrian network using the underlying organization. The pedestrian network is similar to the road network 208. Whereas the road network 208 comprises road segments and nodes, the pedestrian network comprises pedestrian segments following existing paths and orientation nodes on or near existing paths. Whereas a vehicle may be routed and guided from an origin to a destination over the road network 208, a pedestrian may be routed and guided from an origin to a destination over, in part or entirely, the pedestrian network which traverses the organized geographic area using existing or established paths. To develop the pedestrian network, the geographic researcher identifies a series of interconnected pedestrian segments and associated orientation nodes. Each pedestrian segment is associated with two orientation nodes; one orientation node represents one end of the pedestrian segment and the other orientation node represents the other end of the pedestrian segment. The orientation node at either end of the pedestrian segment may correspond to a location at which the pedestrian segment meets another pedestrian segment, where the pedestrian segment meets a road segment, where the pedestrian segment meets a virtual pedestrian segment, at a point of interest or where the pedestrian segment dead-ends.

Figure 8:
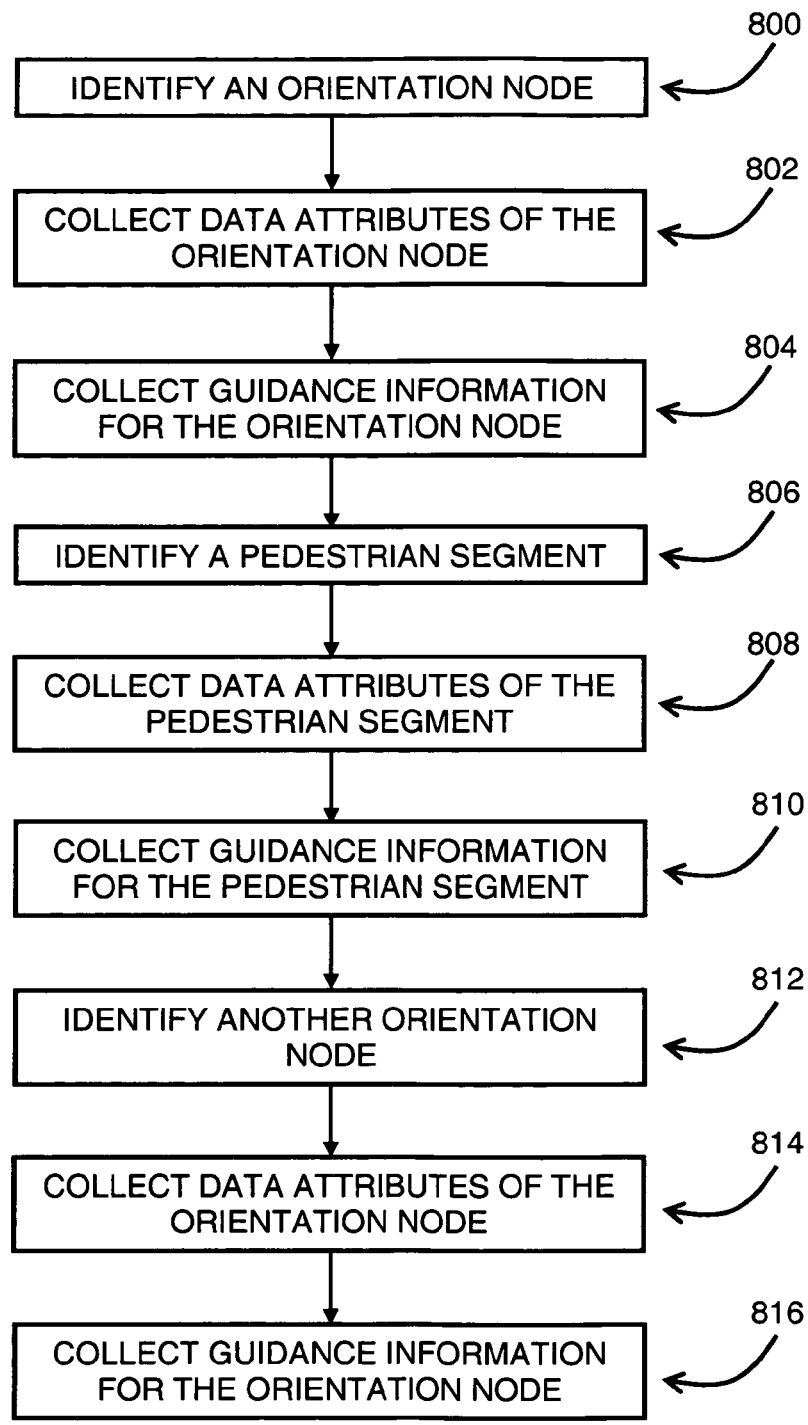
FIG. 8 is a flow chart collecting pedestrian information for organized geographic areas, according to an exemplary embodiment.

FIG. 8 is a flow chart for collecting pedestrian data for organized geographic areas, according to an exemplary embodiment. The steps of FIG. 8 will be illustrated using the established paths 518 and 520 of the park 214 of FIG. 5. In one embodiment, the geographic researcher walks the paths 518 and 520 to collect the pedestrian data. At step 800, the geographic researcher identifies an orientation node for the existing path 518. The location of an orientation node is selected at a location that may be readily described to provide orientation to the pedestrian. In one embodiment, orientation nodes are provided at the intersection of two or more established paths. In one embodiment, the orientation node is selected at a location that may be visually identified by the pedestrian. For the exemplary embodiment illustrated in FIG. 5, an orientation node 548 is located near the entrance gate 550 of the park. The entrance gate 550 is a prominent feature readily visually observed by the pedestrian. Additionally, a clear and concise description of the entrance gate 550, such as entrance gate to park from X Street, provides orientation to the pedestrian.

At step 802, the researcher collects attribute information of the orientation node. The attribute information also may include a latitude and longitude position of the orientation node. A positioning system may be used to determine the latitude and longitude position of the orientation node. The position system may utilize GPS-type technology, a dead reckoning-type system, or combinations of these or other systems, all of which are known in the art. The positioning system may include suitable sensing devices to obtain a GPS signal and to measure the traveling distance speed, direction, and so on, of the system. Alternatively, aerial images of the area may be used to determine the position of the orientation node. Other attribute information of the orientation node that may be collected include: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, and any other attribute information. The geographic researcher may record the attribute information using any data collection method, such as handwriting, voice recording, and data entry into a user device.

At step 804, the researcher collects guidance information for the orientation node. Guidance information includes descriptive words characterizing the location of the orientation node and any surrounding features, such as entrance gate to park from X Street for orientation node 548. These descriptive words will be used as the name for the orientation node.

In one embodiment, the researcher collects the name of the orientation node as a name of a feature visible from the location of orientation node. For the example provided in FIG. 5, the name for the orientation node may be "entrance gate to park from X Street." In one embodiment, the researcher identifies the time of day or seasonal restrictions on the descriptive words or orientation node name. For example, during nighttime hours or during the frozen winter, the entrance gate may not be readily visible to the pedestrian. The geographic researcher may record time and season appropriate alternatives.

Additional guidance information collected by the researcher is a calculate angle data. That is, the researcher indicates whether maneuvers may be performed at the orientation node, such as at the intersection of two or more pedestrian segments. If maneuvers may be performed at the orientation node, the route guidance feature will have to calculate a maneuver angle. For orientation node 548 in FIG. 5, the researcher indicates a yes for the calculate angle data. Furthermore, the researcher collects at explication data. That is, an indication of whether the descriptive words characterizing the location of the orientation node and any surrounding features are helpful to indicate where a maneuver is to be performed or helpful to indicate where the pedestrian is located at when guiding the pedestrian on a route that passes through the orientation node. For the example in FIG. 5, the researcher records a yes indication for the at explication data indicating that "at the entrance gate" provides useful guidance for pedestrians at the orientation node 548. In one embodiment, the researcher may capture an image of the orientation node 548 and its surroundings with a digital camera.

In one embodiment, the researcher also collects connection information indicating whether the orientation node is in close proximity to the road network 208. If the orientation node is close to the road network 208, the researcher identifies the road node close to the orientation node. In another embodiment, the researcher may identify a road segment for connection information. The researcher may record the connection information in the form of a street address, name or ID of a road segment or road node, a distance from a node along an identified road segment, intersection of two identified road segments, a point of interest or in any other appropriate form. If the orientation node is not close to the road network, the researcher records such an indication.

At step 806, the researcher identifies a pedestrian segment. Referring to FIG. 5, the pedestrian segment 552 is a portion of the established path 518. At step 808, the researcher collects attribute information of the pedestrian segment 552. The attribute information also may include a latitude and longitude positions of shape points along the pedestrian segment 552. The attribute information may also include a distance or length of the pedestrian segment, such as 50 meters or an estimated travel time to walk the pedestrian segment. Other attribute information of the pedestrian segment that may be collected include: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, hilly, steps, rough terrain, grade, and any other attribute information. Additionally, the researcher may collect information relating to points of interest proximate the pedestrian segment including location of bike racks, water fountains, toilets, historic sites, recreational facilities, entrances to points of interest or any other information. Additionally, the researcher may collect position data along the pedestrian segment to be used as shape points for cartographically representing the pedestrian segment. In one embodiment, the researcher may capture an image of the pedestrian segment 552 and its surroundings with a digital camera.

At step 810, the researcher collects guidance information for the pedestrian segment 552. The guidance information includes descriptive words characterizing the pedestrian segment and any surrounding features. These descriptive words will be used as the name of the pedestrian segment. In one embodiment, the researcher collects the name of the pedestrian segment as a name of a feature visible from the path. In one embodiment, the visible feature is a readily identifiable geographic feature other than the path itself. In one embodiment, the researcher uses a list of predetermined phrase words for the text description the pedestrian segment. Table I lists phrase words that the researcher may use to collect descriptive words characterizing the pedestrian segment according to an exemplary embodiment. Additional phrase words may be used than those listed in Table I.

TABLE I

| PHRASE ID | PHRASE WORDS |
|---|---|
| 1 | ABOVE |
| 2 | THROUGH |
| 3 | BY |
| 4 | KEEPING <blank> ON YOUR RIGHT |
| 5 | BETWEEN |
| 6 | UP |
| 7 | DOWN |
| 8 | ACROSS |
| 9 | AFTER |
| 10 | ALONG |
| 11 | KEEPING <blank> ON YOUR LEFT |
| 12 | PAST |

Referring to FIG. 5, the researcher collects descriptive words characterizing the pedestrian segment 552 and/or its surroundings as "keeping the <POND> on your left." That is, the name of a visible feature from the pedestrian segment 552 is the "POND," and the phrase words "keeping the <blank> on your left" in conjunction with the visible features provide a text description of the pedestrian segment 552. In another embodiment, the researcher may collect a more detailed text description of the pedestrian segment without reference to one of the phrase words, such as "walk 20 meters and cross the bicycle path." In one embodiment, the researcher identifies the time of day or seasonal restrictions on the descriptive words or segment name. For example, during nighttime hours or during the frozen winter, the pond may not be readily visible to the pedestrian. The geographic researcher may record time and season appropriate alternatives.

The researcher may also record after me data as guidance information. That is, whether describing the pedestrian segment 552 prior to describing the next pedestrian segment 558 is helpful for orientating the pedestrian on a route that passes from the pedestrian segment onto the next pedestrian segment. For the example in FIG. 5, the researcher records a no indication for the after me data indicating that "keeping the <POND> on your left" does not provide helpful orientation because the segment name of pedestrian segment 552 is the same as the next pedestrian segment 558 whose segment name is also "keeping the <POND> on your left." An example of a positive indication for the after me data would be "after the pedestrian bridge."

Additionally, the researcher collects guidance information of do not explicate node data. In one embodiment, one of the endpoints or orientation nodes associated with the pedestrian segment is designated a reference node while the other endpoint or orientation node is designated a non-reference node. In one embodiment, the reference node is the orientation node whose position is the most south and west. For the do not explicate reference node data, the researcher indicates whether the orientation node name of the reference orientation node is not helpful when guiding the pedestrian on a route that passes through the pedestrian segment. For pedestrian segment 552 of FIG. 5, the researcher records a no indicating that explicating the name of orientation node 548 "entrance gate" is useful. The researcher also collects guidance information of do not explicate non-reference node data. For the do not explicate non-reference node data, the researcher indicates whether the orientation node name of the non-reference orientation node is not helpful when guiding the pedestrian on a route that passes through the pedestrian segment. For pedestrian segment 552 of FIG. 5, the researcher records a no indicating that explicating the name of orientation node 554 "drinking fountain" is useful.

In one embodiment, the researcher obtains data representative of the geometry of the pedestrian segment. The geometry of the pedestrian segment may be obtained from aerial or satellite images; alternatively, the researcher may collect latitude and longitude positions at several locations along the pedestrian segment using the positioning system. In one embodiment, the geometry of the pedestrian segment is used to calculate guidance information of angle in and angle out data. The angle in data indicates an initial general direction of the pedestrian segment at the reference orientation node 548; angle out data indicates an ending general direction of the pedestrian segment at the non-reference orientation node 554. In another embodiment, the researcher may record the angle in and angle out information as he or she traverses the pedestrian segment. For the pedestrian segment 552, the researcher records the angle in as approximately due east and the angle out as approximately due east.

The researcher also determines whether the above recorded guidance information is direction sensitive. For example, the guidance information for pedestrian segment 552 in FIG. 5 is direction sensitive. If traveling in one direction along the pedestrian segment 552, the pedestrian segment name should be "keeping the <POND> on your left," traveling in the opposite direction along the pedestrian segment, the pedestrian segment name should be "keeping the <POND> on your right." In one embodiment, if the pedestrian segment is direction sensitive, the researcher collects separate guidance data described above for a pedestrian walking in the opposite direction. In one embodiment, the researcher also captures an image of the pedestrian segment 552 and its surroundings with a digital camera. Moreover, in another embodiment, the researcher may identify the location of points of interest, such as toilets, bike racks, drinking fountains, recreation facilities, historical sites or any other point of interest, proximate the pedestrian segment.

Referring to FIG. 8, the researcher identifies another orientation node along the established path 518 at step 812. The location of the orientation node is selected at another location that may be readily described to provide orientation to the pedestrian along the established path 518. The second orientation node is selected at a distance from the first orientation node along the established path 518 such that a pedestrian may be directed from the first orientation node location to the second orientation node location. In one embodiment, the second orientation node selected a distance along the path 518 from the first orientation node such that the pedestrian may visually identify the location of the second orientation node from the location of the first orientation node. In another embodiment, the second orientation node location may be obscured from view or beyond visual identification from the first orientation node location. For example, the pedestrian may be directed to walk along the established path 518 in a certain direction, such as toward a lake, and after walking some distance, the second orientation node comes into view.

For the exemplary embodiment illustrated in FIG. 5, a second orientation node 554 along the established path 518 is located near a drinking fountain 556. The drinking fountain 530 is a feature just off of the established path 518 that is readily visually observed by the pedestrian. The second orientation 554 terminates the pedestrian segment 552.

At step 814, the researcher collects attribute information of the orientation node. The attribute information also may include a latitude and longitude position of the orientation node. The other attribute information for the second orientation node is the same as that described above for the first orientation node. At step 816, the researcher collects guidance information for the second orientation node 554. Guidance information for the second orientation node is similar as that described above for the first orientation node 548. For the orientation node 554, the collected guidance information includes orientation node name of "the drinking fountain," no for calculate angle data, and yes for at explication data.

Referring to FIG. 5, the researcher continues to identify and collect information for orientation nodes and pedestrian segments for the established paths 518 and 520 following the steps of FIG. 8. The following description will highlight a portion of the information collected for the exemplary embodiment using FIG. 5. The researcher identifies pedestrian segment 558 and collects data attributes and guidance information for the pedestrian segment 558. Briefly, the collected guidance information for pedestrian segment 558 includes descriptive text characterizing the pedestrian segment 558 as "keeping the <POND> on your left," a no for after me data, a no for do not explicate reference node data, a no for do not explicate non-reference node data, approximately due east for angle in data, approximately due north for angle out data, and an indication that the above recorded guidance information is direction sensitive for pedestrian segment 558.

The researcher identifies orientation node 562 and collects data attributes and guidance information for the orientation node 562. For the orientation node 562, the collected guidance information includes orientation node name of "the pedestrian bridge," no for calculate angle data, and no for at explication data. The researcher identifies pedestrian segment 564 and collects data attributes and guidance information for the pedestrian segment 564. Briefly, the collected guidance information for pedestrian segment 564 includes descriptive text characterizing the pedestrian segment 564 as the phrase "across" and "the bridge," a yes for after me data, a no for do not explicate reference node data, a yes for do not non-reference node data, approximately due north for angle in data, approximately due north for angle out data, and an indication that the above recorded guidance information is not direction sensitive for pedestrian segment 564.

The researcher identifies orientation node 566 and collects data attributes and guidance information for the orientation node 566. For the orientation node 566, the collected guidance information includes orientation node name of "the pedestrian bridge," no for calculate angle data, and no for at explication data. The researcher identifies pedestrian segment 568 and collects data attributes and guidance information for the pedestrian segment 568. Briefly, the collected guidance information for pedestrian segment 568 includes descriptive text characterizing the pedestrian segment 568 as the phrase "up" and "the hill," a no for after me data, a no for do not explicate reference node data, a no for do not explicate non-reference node data, approximately due north for angle in data, approximately northeast for angle out data, and an indication that the above recorded guidance information is direction sensitive for pedestrian segment 568.

The researcher identifies orientation node 570 and collects data attributes and guidance information for the orientation node 570. For the orientation node 570, the collected guidance information includes orientation node name of "the toilets," no for calculate angle data, and yes for at explication data. The researcher identifies pedestrian segment 574 and collects data attributes and guidance information for the pedestrian segment 574. Briefly, the collected guidance information for pedestrian segment 574 includes descriptive text characterizing the pedestrian segment 558 as "keeping the <parking lot> on your left," a no for after me data, a no for do not explicate reference node data, a no for do not explicate non-reference node data, approximately northeast for angle in data, approximately due east for angles out data, and an indication that the above recorded guidance information is direction sensitive for pedestrian segment 574. For the orientation node 576, the collected guidance information includes orientation node name of "the entrance gate for Y Street," yes for calculate angle data, yes for at explication data, and connection to road segment 512.

In alternative embodiments, the steps for collecting pedestrian data for organized geographic areas may be performed in a different order than presented in FIG. 8. In one embodiment, the researcher travels the identified pedestrian segments in both directions to collect different guidance information for each direction of travel. To support multiple languages, the descriptive texts for the orientation nodes, pedestrian segments and other guidance information may be collected in multiple languages according to rules of the individual languages. Alternatively, the guidance texts and other guidance information may be translated to other languages. Additionally, although the collection of guidance information has been described in conjunction with the collection of pedestrian data for organized geographic areas, similar guidance information may be collected for the virtual pedestrian network for unorganized geographic areas including descriptive texts for virtual pedestrian nodes and orientation nodes.

Additionally, although the above description for collecting pedestrian data for organized geographic areas has been illustrated using established paths 518 and 520 of the park 214, the researcher may also collect pedestrian data for the existing road network and for inside buildings as will be briefly described in the following paragraphs.

The geographic researcher may collect pedestrian data for the existing road network in a similar manner as described above in conjunction with FIG. 8. In one embodiment, the geographic researcher walks the sidewalks along road segments to identify orientation nodes and pedestrian segments and to collect data attributes and guidance information for those orientation nodes and pedestrian segments. The existing sidewalks are like the existing paths 518 and 520 of the park 214. In one embodiment, the researcher identifies orientation nodes at the intersection of at least two road segments corresponding to a road network node. The identified orientation node may be assigned the same position information as the corresponding road network node. Alternatively, the position information for the orientation nodes may be determined using a positioning system as discussed above. The researcher may also identify additional orientation nodes not associated with the road network nodes. The researcher collects attribute information of the orientation node similar to that described above in conjunction with FIG. 8. The researcher also collects guidance information for the orientation node including descriptive texts characterizing the location of the orientation node and identifying a visible feature from the orientation node, calculate angle data, and at explication data. In one embodiment, the researcher also captures an image of the orientation node 548 and its surroundings with a digital camera.

In one embodiment, the researcher identifies pedestrian segments along the existing sidewalks. The researcher collects attribute data and guidance information for the pedestrian segment similar to that described above in conjunction with FIG. 8. The position information for the pedestrian segment may be identical to the position information for the associated road segment. Alternatively, the position information for the pedestrian segment may be determined using a positioning system as discussed above. The researcher also collects descriptive texts, using phrases from Table I and identifying features visible from the pedestrian segment. The researcher may also record after me data, do not explicate reference node data, do not explicate non-reference node data, angle in and angle out data, and an indication of whether the guidance information is direction sensitive. In one embodiment, the researcher also captures an image of the pedestrian segment and its surroundings with a digital camera. Moreover, in another embodiment, the researcher may identify the location of points of interest proximate the pedestrian segment. The researcher may also collect attribute information of the pedestrian segment including: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, gravel area, dirt area, hilly, steps, rough terrain, grade, alley, curb cutouts, pedestrian function class similar to road function class, shopping zone, neighborhood zone, traffic light locations, stop sign locations, crosswalks, entrance locations for points of interest, whether associated road segment is crossable at any location, and any other attribute information.

Furthermore, the geographic researcher may collect pedestrian data for existing paths inside buildings in a similar manner as described above in conjunction with FIG. 8. In one embodiment, the geographic researcher walks the paths, such as hallways, corridors, walkways, stairs, elevators, escalators, in an office building to identify orientation nodes and pedestrian segments and to collect data attributes and guidance information for those orientation nodes and pedestrian segments. In another embodiment, the geographic researcher uses floor plans and building blueprints to collect pedestrian data.

In one embodiment, the researcher identifies orientation nodes at the intersection of at least two paths, such as hallways, corridors, walkways, stairs, elevators, escalators or any other path. The researcher may also identify additional orientation nodes at locations that may be readily visually identified based on text descriptions, such as "the water fountain." Briefly, the researcher collects attribute information of the orientation node similar to that described above in conjunction with FIG. 8. The researcher also collects guidance information for the orientation node including descriptive texts characterizing the location of the orientation node and identifying features visible from the orientation node, such as "the copy machine." The researcher also collects the guidance information of the calculate angle data, and at explication data. In one embodiment, the researcher also captures an image of the orientation node 548 and its surroundings with a digital camera.

In one embodiment, the researcher identifies pedestrian segments along the existing paths between established orientation nodes inside the office building. Briefly, the researcher collects attribute information of the pedestrian segment similar to that described above in conjunction with FIG. 8. The researcher also collects guidance information for the pedestrian segment including descriptive texts, using phrases from Table I and identifying features visible from the pedestrian segment, such as "keeping the <WATER COOLER> on your right." The researcher may also record after me data, do not explicate reference node data, do not explicate non-reference node data, angle in and angle out data, and an indication of whether the guidance information is direction sensitive. In one embodiment, the researcher also captures an image of the pedestrian segment and its surroundings with a digital camera. Moreover, in another embodiment, the researcher may identify the location of offices, cubicles, conference rooms, computer equipment, emergency escape routes, number of stairs or any other office item, proximate the pedestrian segment. In other embodiments, the researcher may collect pedestrian data for other buildings, including warehouses, retail stores, museums, libraries, schools, restaurants, or any other structure.

In another embodiment, the geographic researcher may collect pedestrian data for inside buildings where paths do not exist in a similar manner as described above in conjunction with the collecting data for the virtual pedestrian network of FIG. 6. In one embodiment, the geographic researcher walks the building to identify orientation nodes and virtual pedestrian segments and to collect data attributes and guidance information for those orientation nodes and virtual pedestrian segments.

In alternative embodiments, the geographic researcher may collect data similar to the pedestrian data described above in conjunction with FIG. 8 for the road network. That is, the researcher may collect similar guidance information for road segment and road network nodes.

C. Collecting Textual Pedestrian Guidance Data

In another embodiment, the researcher collects data to provide a textual guidance route from an identified origin point to an identified destination point. That is, the textual guidance route is a series of messages describing paths and maneuvers to travel from the origin to the destination. In some circumstances, it may be optimal to provide pedestrians with pre-composed textual guidance routes for travel within a certain geographic area, such as a subway station or a large building. For example, a pedestrian exiting a subway car faces a number of somewhat confusing choices for directions to travel and/or exits to connect with the road network and/or pedestrian network.

Figure 9A:
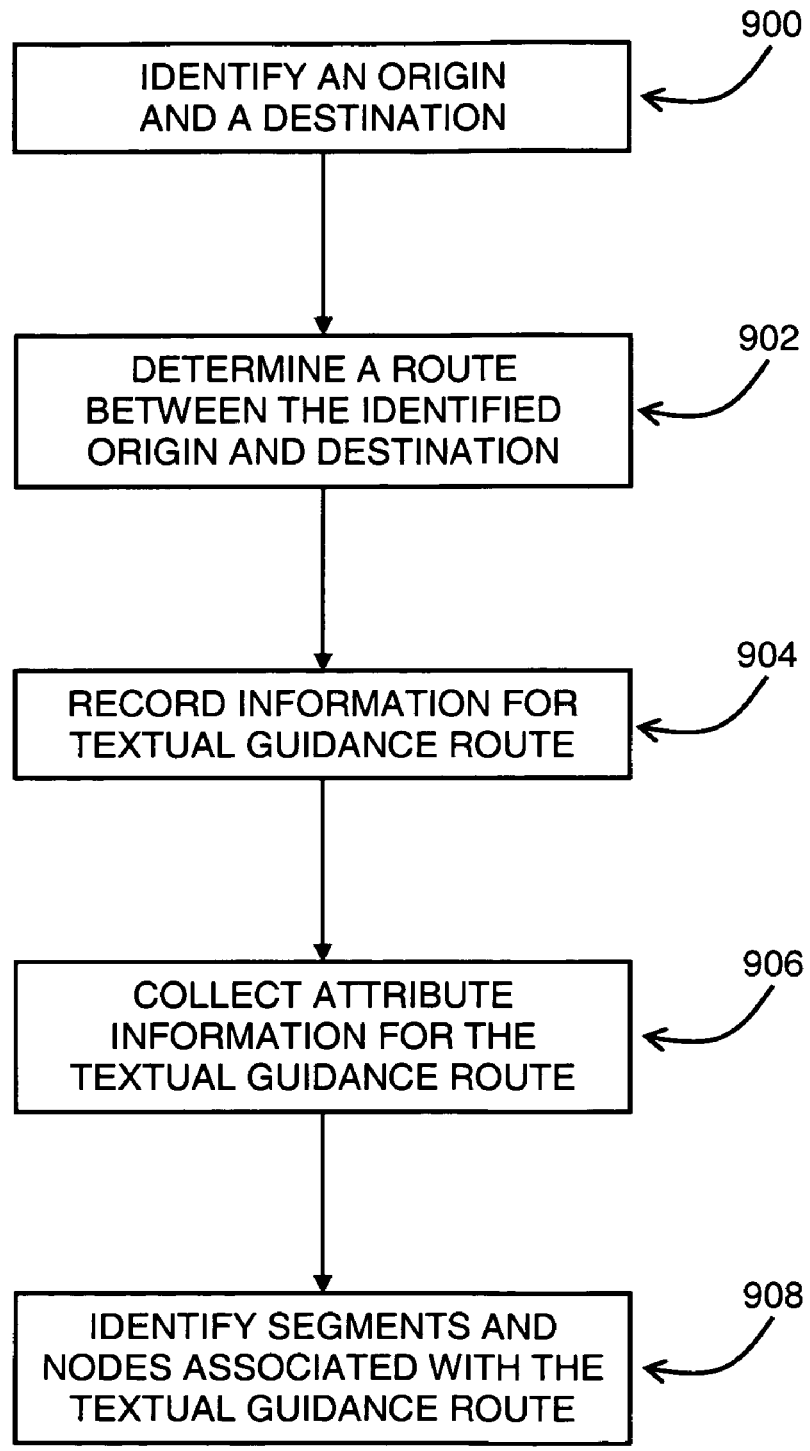
FIG. 9A is a flow chart for collecting pedestrian text route guidance information, according to an exemplary embodiment.
Figure 9B:
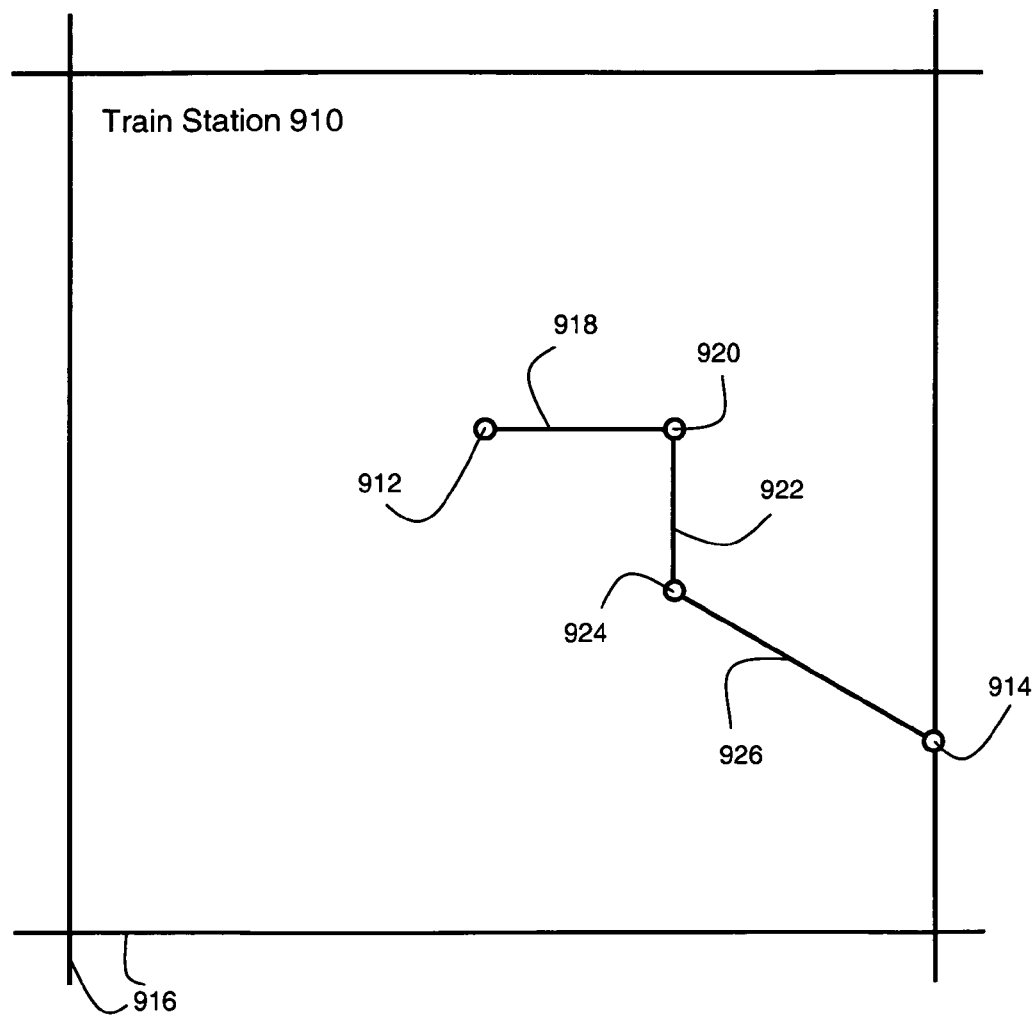
FIG. 9B is a representation of a portion of a train station.

FIG. 9a is a flow chart for a collecting textual guidance route, according to an exemplary embodiment. The steps of FIG. 9a will be illustrated with an illustration of a train station 910 in FIG. 9b. At step 900, the researcher identifies an origin and a destination. For the exemplary embodiment, the origin 912 is a train platform where passengers exit a train, and the destination is a southern exit 914 that connects to the road network 916. At step 902, the researcher determines a route between the identified origin and destination. In one embodiment, the researcher travels several different routes between the origin and destination and determines which of the available routes is most desirable. When determining which route is most favorable, the researcher may consider several factors including, ease of travel, ease of description, distance traveled, time to traverse route, congestion levels or any other information. At step 904, the researcher records information for composing a textual guidance route. In one embodiment, the researcher records information in a manner similar to providing verbal instructions for traveling the route from the origin to the destination to another person. The researcher records information explaining how to traverse the route; the information may include orientation information, such as references to surrounding structures, features, points of interest and/or signage, and maneuver information, such as travel up the elevator or stairs, turn left or right, head straight for twenty meters.

In one embodiment, the researcher collects time of day related information for the textual guidance route. Using the time of day information, the route determined in step 902 may be modified based on time of the day. For example, the train station may have reversible escalators. In the morning, the escalators may favor train passengers leaving the train station, while in the evening the escalators may favor train passengers arriving at the train station.

The following is an example of the textual guidance route information collected by the researcher to travel from the origin of the train platform 912 to the destination of a Y Street exit 914 for the train station 910:

"After exiting the train, turn left. After entering the station, turn right and walk down the stairs. After reaching the bottom of the stairs, veer to the left and head towards the escalators. Take one of the three escalators to the top. After exiting the escalator, walk past the store on your right to another set of escalators. Take one of the two escalators to the top and go through the doors onto Y Street."

At step 906, the researcher collects attribute information for the textual guidance route. Attribute information may include: wheel chair accessible, children friendly, pet friendly, well-lighted area, poorly lighted area, busy area, non-busy area, noisy, peaceful, smelly/polluted, sheltered from rain, not sheltered from rain, no bikes allowed, stair count, shopping zone, and any other attribute information. In one embodiment, the researcher may identify several textual guidance routes for the same origin to destination. Each route may have specific attributes, such as wheel chair accessible or sheltered from the weather.

At step 908, the researcher identifies any road segments, road nodes, pedestrian segments, virtual pedestrian segments and/or orientation nodes that correspond with the textual guidance route. In the exemplary embodiment, the textual guidance route traverses several pedestrian segments and orientation nodes 918, 920, 922, 924 and 926.

In one embodiment, the textual guidance route may be used to provide transitions between the road network and a public transportation network. In an alternative embodiment, textual guidance routes may be created to guide users for travel over the public transportation network. For example, the researcher may determine a route between an origin and a destination that includes public transportation. An example of the textual guidance route including public transportation recorded by the researcher is, in part, "Take bus 7 at platform 2. Remain on the bus passing Q Street, L Street and K Street stops. Exit the bus at Y Street stop." Additionally, the researcher identifies the road segments, road nodes and other geographic features traversed by the public transportation.

IV. Geographic Database with Pedestrian Data

The pedestrian data collected as described above is included in the geographic database 116 that represents some of the physical geographic features in the geographic region 202. In the embodiment of FIG. 3, the geographic database 116 that represents the geographic region 202 contains at least one pedestrian segment database record 308 for each pedestrian segment identified in the geographic region 202. The geographic database 116 also includes a pedestrian orientation node database record 310 for each orientation node identified in the geographic region 202.

Figure 10:
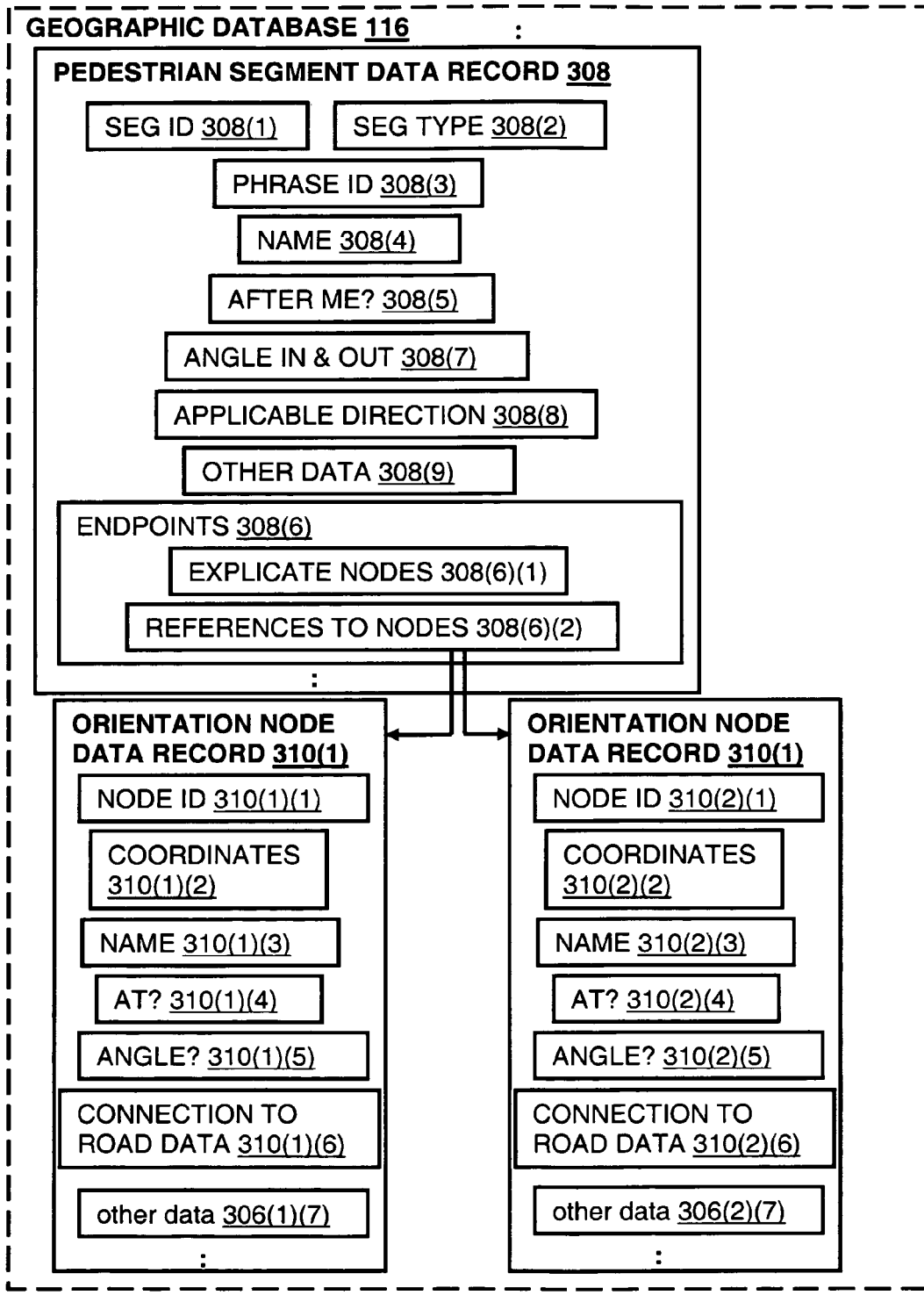
FIG. 10 is a block diagram of components of pedestrian segment and orientation node data records, according to an exemplary embodiment.

FIG. 10 shows some of the components of a pedestrian segment data record 308 contained in the geographic database 116. The pedestrian segment data record 308 includes a segment ID 308(1) by which the data record can be identified in the geographic database 116. Each pedestrian segment data record 308 has associated with it information (such as "attributes", "fields", etc.) that describes features of the represented pedestrian segment. The pedestrian segment data record 308 may include data 308(2) that indicate a type of pedestrian segment, such as virtual pedestrian path, paved pedestrian path, unpaved pedestrian path, sidewalk, alley, indoor path. The pedestrian segment data record 308 includes data 308(3) that indicate a phrase ID and data indicating a name 308(4), such as a name of a visible feature from the segment, which together provide a text description characterizing the pedestrian segment. The data indicating the phrase ID provides a predetermined phrase that accompanies the name to describe the pedestrian segment, for example: "keeping the < > on your left" is the phrase and "POND" is the name. The phrase ID may be similar to those illustrated above in Table I.

The pedestrian segment data record 304 may also include after me data 308(5) indicating whether describing the represented pedestrian segment prior to describing the next pedestrian segment is helpful for orientating the pedestrian on a route that passes from the pedestrian segment onto the next pedestrian segment. The pedestrian segment data record 308 may also include angle in and angle out data 308(7) indicating a general direction of the pedestrian segment from the reference orientation node ("angle in") and a general direction of the end of the pedestrian segment toward the non-reference orientation node ("angle out"). The pedestrian segment data record 308 may further include applicable direction data 308(8) indicating whether direction of travel on the pedestrian segment affects how the pedestrian segment should be described, and if so, the direction of travel associated with the above data.

The pedestrian segment data record 308 also includes data 308(6) relating to the end points of the represented pedestrian segment. The endpoint data includes data 308(6)(1) indicating whether the reference and/or non-reference orientation node should be identified when describing a route that goes through the pedestrian segment. In one embodiment, the endpoint data 308(6) also include references 308(6)(2) to the orientation node data records 310 that represent the orientation nodes corresponding to the end points of the represented pedestrian segment. The pedestrian segment data record 308 may also include or be associated with other data 308(9) that refer to various other attributes of the represented pedestrian segment. In one embodiment, the other data references other database records that provide data representing the geometry of the segment. Additionally, the various attributes associated with a pedestrian segment may be included in a single pedestrian segment record, or may be included in more than one type of record which cross-references to each other. Attributes of the pedestrian segment may be any of the attributed described above in conjunction with the discussion of collecting pedestrian data including: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, shopping zone, neighborhood zone, images and any other attribute information.

FIG. 10 also shows some of the components of an orientation node data record 310 contained in the geographic database 116. Each orientation node data record 310(1) and 310(2) includes a node ID 310(1)(1) and 310(2)(1) by which the data record can be identified in the geographic database 116. Each of the orientation node data records 310 may have associated information (such as "attributes", "fields", etc.) that allows identification of the pedestrian segment(s) that connect to it and/or its geographic position (e.g., its latitude and longitude coordinates). For the embodiment shown in FIG. 10, the orientation node data records 310(1) and 310(2) include the latitude and longitude coordinates 310(1)(2) and 310(2)(2) for their node.

Each orientation node data record also includes data indicating an orientation node name 310(1)(3) and 310(2)(3), such as the visible feature name that characterize the location of the orientation node. Each orientation node data record may further include at explication data 310(1)(4) and 310(2)(4) indicating whether the orientation node should be referred to when providing guidance for a pedestrian route that passes through the node. Each orientation node data record may further include calculate angle data 310(1)(5) and 310(2)(5) indicating whether an angle for a maneuver should be calculated at the orientation node when providing guidance for a pedestrian route that passes through the node. Each orientation node data record also includes connection data 310(1)(6) and 310(2)(6) indicating connection, if any, to the road network. In one embodiment, the connection data 310(1)(6) and 310(2)(6) are references to the road segment data records 304 and/or road network node data records 306 that represent the road segments and nodes that connect with the orientation node. The node data records 310(1) and 310(2) may also include other data 310(1)(7) and 310(2)(7) that refer to various other attributes of the nodes. Attributes of the orientation node include: wheel chair accessible, children friendly, pet friendly, well-lighted area, poorly lighted area, busy area, non-busy area, noisy, peaceful, smelly/polluted, sheltered from rain, not sheltered from rain, no bikes allowed, tree lined, paved area, unpaved area, grassy area, gravel area, dirt area, muddy when wet area, images and any other attribute information.

FIG. 11 is a table 1100 of pedestrian segment data records 308, according to an exemplary embodiment. The table 1100 represents a portion of the data stored in the geographic database 116. The columns of the table 1100 correspond with the data described above for the pedestrian segment data record 308 stored in the geographic database 116. Data in a segment type column 1102 identifies a particular segment type code. For example, segment type code 996 may represent that the pedestrian segment is a paved pedestrian-only path. Data in a segment ID column 1104 provides an identification code by which the data record can be identified in the geographic database 116. The segment identification code is a unique identifier assigned to a particular pedestrian segment record 308. For the exemplary embodiment illustrated in FIG. 11, the unique segment IDs 1104 are letters; however, other unique identifiers, such as numeric or alphanumeric codes may also be used to uniquely identify a pedestrian segment record 308.

Data in a reference node ID column 1106 and a non-reference node ID column 1108 identify the end points or respective orientation nodes associated with the pedestrian segment with one of the orientation nodes being identified as the reference node and the other being identified as the non-reference node. The data in the reference node ID column 1106 and the non-reference node ID column 1108 provide the orientation node ID of the respective orientation node.

Data in a phrase ID column 1110 includes a phrase identification number identifying a particular phrase to use with the segment name to form the text description of the pedestrian segment. Table I provides a list of phrase IDs and associated phrases, according to an exemplary embodiment. Additional phrases and synonyms of the existing phrases may be added to Table I. Data in a name column 1112 provides a name for the pedestrian segment. Data in an after me column 1114 identifies whether or not to begin a pedestrian guidance message for the next pedestrian segment with the word "after" followed by the segment name of the previous pedestrian segment name as found in the segment name column 1112. For example, the previous pedestrian segment may be pedestrian segment E as depicted in FIG. 11. The segment name of pedestrian segment E is "the bridge." Because the phrase "after the bridge" may be useful to a pedestrian, the after me data for pedestrian segment E may contain a yes, which indicates that a pedestrian guidance message for a pedestrian segment following the bridge may start with "after the bridge."

Data in a do not explicate reference node column 1116 and a do not explicate non-reference node column 1118 may each be used to suppress a reference to the endpoints or orientation nodes associated with the pedestrian segment when providing pedestrian guidance. This feature may be useful when a reference to the orientation node would be meaningless from a particular direction. Data in an angle in column 1120 may identify the angle of travel or direction of travel for an initial portion of the pedestrian segment from the reference orientation node or endpoint. Data in an angle out column 1122 may identify the angle of travel or direction of travel for a final portion of the pedestrian segment toward the non-reference orientation node or endpoint. Data in an applicable in the from reference node direction column 1124 and an applicable in the to reference node direction column 1126 may be used when the pedestrian guidance message may be different depending on a direction of travel (i.e., towards or away from the associate reference orientation node). The table 1100 may include additional data. For example, the table may include a column identifying connection data of an associated road segment ID or road network node ID.

FIG. 12 is a table 1200 of orientation node records 310, according to an exemplary embodiment. The table 1200 represents a portion of the data stored in the geographic database 116. The columns of the table 1200 correspond with the data described above for the orientation node data records 310 stored in the geographic database 116. Data in a node ID column 1202 provides an identification code by which the orientation node data record can be identified in the geographic database 116. The orientation node identification code is a unique identifier assigned to a particular orientation node data record 310. For the exemplary embodiment illustrated in FIG. 12, the unique orientation node ID are numbers; however, other unique identifiers, such as numeric or alphanumeric codes may also be used to uniquely identify an orientation node data record 310.

Data in columns 1204 and 1206 provide the coordinates, latitude and longitude, of each orientation node 310. Data in a name column 1208 includes a name of the orientation node. Data in a calculate angle column 1210 identifies whether or not at the orientation node a maneuver angle should be determined for providing pedestrian guidance through the node. If a calculate angle data contains a no (N), then no angle needs to be determined. If the calculate angle data contains a yes (Y), then a maneuver angle is determined when providing pedestrian guidance through the node.

Data in an at explication column 1212 identifies whether or not the name in the orientation node name data is to be used in a pedestrian guidance message at the orientation node. In some situations, describing the current orientation node in a pedestrian guidance message may be useful to a pedestrian. In that case, at explication data contains a yes so that a reference to the current orientation node is added to the pedestrian guidance message. However, in other situations adding a reference to the current orientation node may be awkward and not provide useful guidance to a pedestrian. For example, when a pedestrian arrives at a bridge, a message "At the bridge, walk across the bridge," would be awkward. By filling the at explication data with a no, the pedestrian would receive the message, "Walk across the bridge." Data in a connection column 1214 provides references to the road network data records, either road segment data records 304 or node data records 306, that connect with the orientation node.

Figure 13:
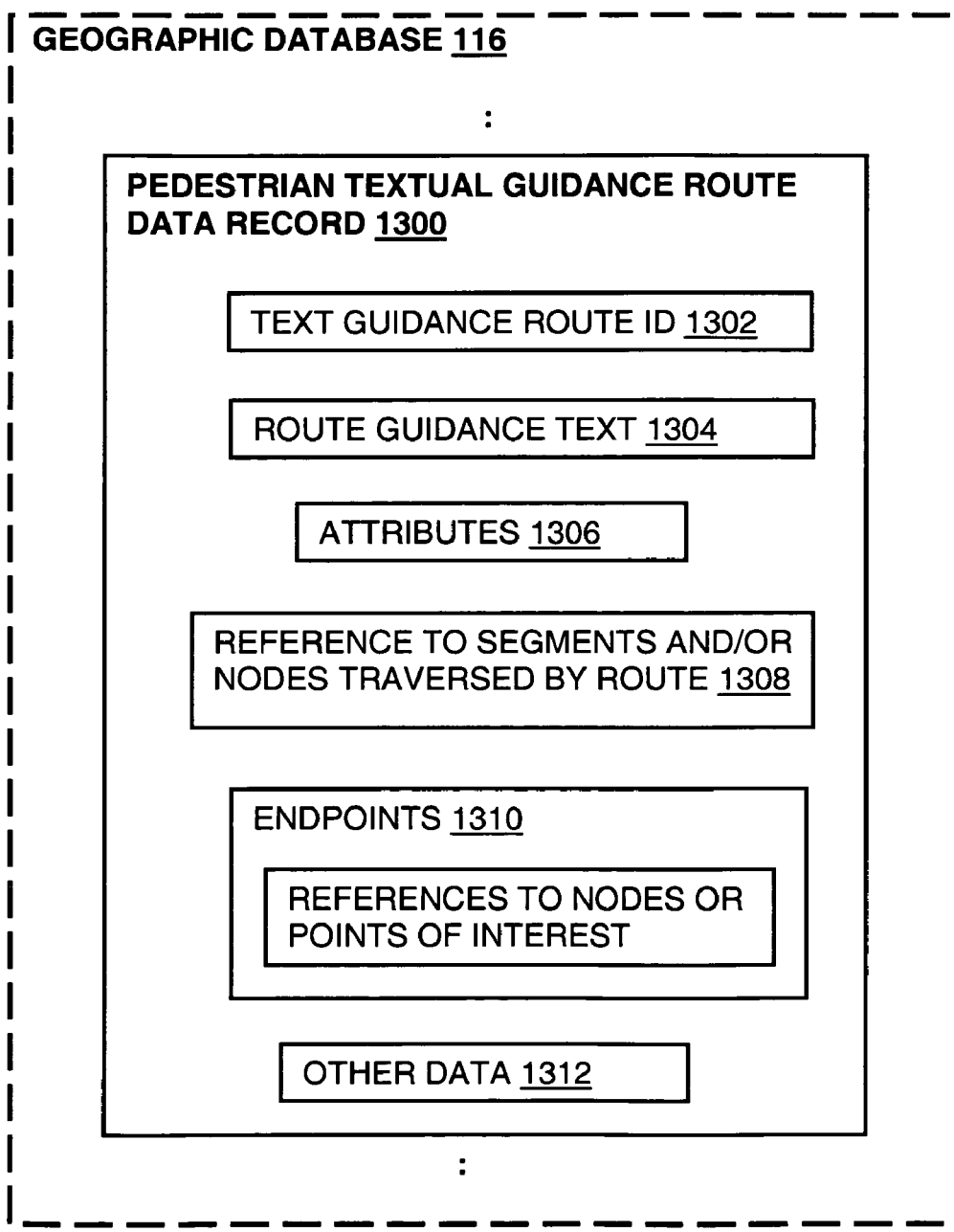
FIG. 13 is a block diagram of components of a pedestrian text route guidance data record, according to an exemplary embodiment.

FIG. 13 shows some of the components of a pedestrian textual guidance route data record 1300 contained in the geographic database 116. The pedestrian textual guidance route guidance data record 1300 contains information collected to provide complete textual guidance route from a specified origin to a specified destination. The pedestrian textual guidance route data record 1300 includes a text guidance route ID 1302 by which the data record can be identified in the geographic database 116. Each pedestrian textual guidance route data record 1300 contains a complete route guidance text from the established origin to the established destination in the route guidance text data 1304. An example of the route guidance text data 1304 is the following between an origin of a train platform to the destination of a Y Street exit for a train station:

"After exiting the train, turn left. After entering the station, turn right and walk down the stairs. After reaching the bottom of the stairs, veer to the left and head toward the escalators. Take one of the three escalators to the top. After exiting the escalator, walk past the store on your right to another set of escalators. Take one of the two escalators to the top and go through the doors onto Y Street."

Each pedestrian textual guidance route data record 1300 has associated with it attribute data 1306 that describes features of the route guidance text such as: wheel chair accessible, well-lighted area, busy area, noisy, sheltered from rain, stair count, shopping zone, images and any other attribute information. In one embodiment, the pedestrian textual guidance route data record 1300 includes alternative route guidance text for different times of the day.

The pedestrian text route guidance data record 1300 also includes data 1308 relating to the segments and/or nodes traversed by the route guidance text. The data 1308 provides references to the segments and/or nodes traversed by the route. The data 1308 may be used to provide a map display with a route highlight corresponding to the segments traversed by the route guidance text. The pedestrian text route guidance data record 1300 includes data 1310 relating to the end points of the represented route guidance text. The endpoint data includes data indicating the origin and destination of the represented route guidance text. In one embodiment, the endpoint data 1310 include references to the node data records 306 and 310 and point of interest data records that represent the node(s) and/or point of interest corresponding to the origin and destination of the represented route guidance text. The pedestrian textual guidance route data record 1300 may also include or be associated with other data 1312 that refer to various other information of the represented route guidance text.

Referring to FIG. 4, the road segment data records 304 and road network node data records 306 may also include pedestrian-related data 304(5) and 306(1)(2), 306(2)(2). In one embodiment, the pedestrian-related data 304(5) associated with the road segment data record 304 are references to pedestrian segment data records 308 associated with the road segment, such as pedestrian segments representing sidewalks. Similarly, the pedestrian-related data 306(1)(2), 306(2)(2) associated with the road network node data record 306 are references to orientation node data records 310 associated with the road nodes. In another embodiment, the pedestrian-related data 304(5) and 306(1)(2) are references to pedestrian text route guidance data records 1300 associated with the road segments, road nodes or points of interest proximate the road segments or road nodes.

In another embodiment, the pedestrian-related data 304(5) associated with the road segment data record 304 are pedestrian-related attributes of the road segment, such as a description of sidewalks, location of crosswalks, crosscut curbs, tree-lined, location of traffic signals, location of stop signs, pedestrian enablement, crossability of road segment, noisy, polluted, bike-friendly, wheel chair accessible, shopping zone, neighborhood zone or any other attribute information. The pedestrian-related data 306(1)(2) associated with the road node data records 306 are similar pedestrian-related attributes of the road node.

V. Route Calculation for a Pedestrian

As discussed above in conjunction with FIG. 1, the navigation system 100 includes navigation application software programs 110 that provide the various navigation features and functions. In one embodiment, the navigation functions and features may include route calculation 124 for a pedestrian. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as walking preferences (e.g., avoid polluted areas). Given at least the identification of the starting location and the destination location, the route calculation function 124 attempts to determine one or more solution routes between the starting location and the destination location. A solution route is formed of a series of connected road and/or pedestrian segments over which the pedestrian can travel from the starting location to the destination location. When the route calculation function 124 calculates a route, it accesses the geographic database 116 and obtains road segment data entities 304 and/or pedestrian segment data entities 308 that represent segments around and between the starting location and the destination location. The route calculation function 124 uses the information in the road and/or pedestrian segment data entities 304 and 308 to attempt to determine at least one valid solution route from the starting location to the destination location. In determining a valid solution route for the pedestrian to travel, the route calculation program 124 uses the data attributes associated with the road and/or pedestrian segment data entities to account for walking preferences (e.g., paved surface, tree lined). The route calculation function 124 may attempt to find a solution route that takes the least time to travel, that covers the least distance, or that meets some other specifiable criteria.

The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Figure 14:
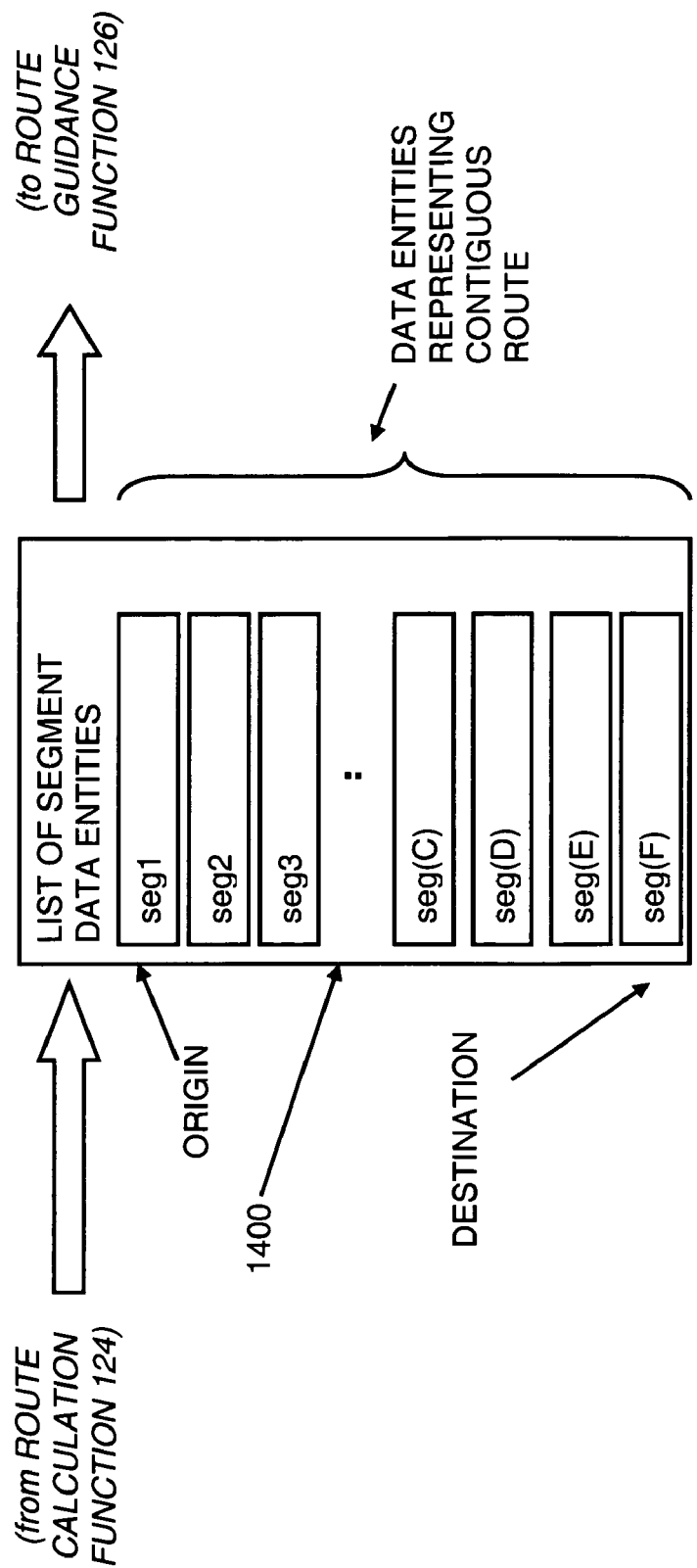
FIG. 14 is a block diagram illustrating components of the output of a route calculation function, according to an exemplary embodiment.

The route calculation function 124 provides an output. In one embodiment, the output of the route calculation function 124 is in the form of an ordered list 1400 identifying a plurality of road and/or pedestrian segment data entities. FIG. 14 illustrates the pedestrian segment data entities 308 (i.e., seg1, seg2, seg3, . . . , seg(E), seg(F)) from the geographic database 116 included in an exemplary output list 1300 generated by the route calculation function 124. The plurality of pedestrian segment data entities 1400 represent the pedestrian segments that form the continuous navigable route between the origin and the destination that had been calculated by the route calculation function 124. (The route calculation function 124 may calculate more than one solution route.)

VI. Route Guidance for a Pedestrian

As discussed above in conjunction with FIG. 1, the navigation system 100 includes navigation application software programs 110 that provide the various navigation features and functions. The navigation functions and features may include route guidance 126 for a pedestrian. The route guidance function 126 provides detailed direction for reaching a desired destination. In one embodiment, the list 1400 of pedestrian segment data entities determined by the route calculation function 124 is provided to the route guidance function 126. The route guidance function 126 uses the information in the list 1400, as well as additional information from the geographic database 116, to provide instructions to the end user to travel the route defined by the list 1400 output by the route calculation function 124. The route guidance function 126 may include functions that identify locations along the calculated route at which maneuvering instructions may be provided to the end user. The route guidance function 126 may provide the maneuvering instructions all at once, or alternatively, the route guidance function 126 may provide the maneuvering instructions one at a time as the pedestrian is traveling. In one embodiment, each maneuvering instruction is provided separately (or in small groups of combined maneuvering instructions) in advance of when the specific maneuver is required to be taken so that the end user can prepare to make the required maneuver. The output of the route guidance function 126 is provided to the end user through a user interface 114 included on the computing platform 102. The output of the route guidance may be conveyed audibly through speech synthesis or on a visual display.

Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In order to provide maneuvering instructions at appropriate times and/or locations, the navigation system 100 uses data from the positioning system (112 in FIG. 1). The positioning system 112 determines the position of the pedestrian (computing platform 102) as he or she is traveling. A positioning (map-matching) function 130 in the navigation programming 110 compares the pedestrian's position determined by the positioning system 112 to the positions of the pedestrian segments represented by the pedestrian segment data entities in the solution walking route 1400. Using this comparison, the maneuver instructions, which are related to positions along the solution walking route, can be provided at appropriates times as these positions are approached.

The route guidance function 126 may also provide the end user with information about the remaining distance to the destination location. The list 1400 of pedestrian segment data entities from the route calculation function 124 may also be provided to the map display function 128. The map display function 128 uses the information in the list 1400, as well as additional information from the geographic database 116, to provide graphical maps on a display of the user interface 114. The graphical maps illustrate the areas through which the calculated route passes. The path of the calculated route may be highlighted on the displayed maps.

The route guidance function 126 includes a pedestrian guidance function that generates pedestrian guidance messages having sufficient information to guide the pedestrian along the calculated walking route and to reduce the likelihood of the pedestrian becoming confused as to their orientation. In one embodiment, the pedestrian guidance function generates a pedestrian guidance message for each pedestrian segment in the ordered list 1400 from the route calculation function 124. In the exemplary embodiment, each pedestrian guidance message provides a reference to a previous pedestrian segment (if any), followed by a reference to a current orientation node, followed by a reference to a current pedestrian segment, which is followed by a reference to a next orientation node. Not all pedestrian guidance messages contain all four references. In one embodiment, data in the orientation node data entities 310 and the pedestrian segment data entities 308 of the geographic database 116 indicate what information to include in the pedestrian guidance message.

Figure 15:
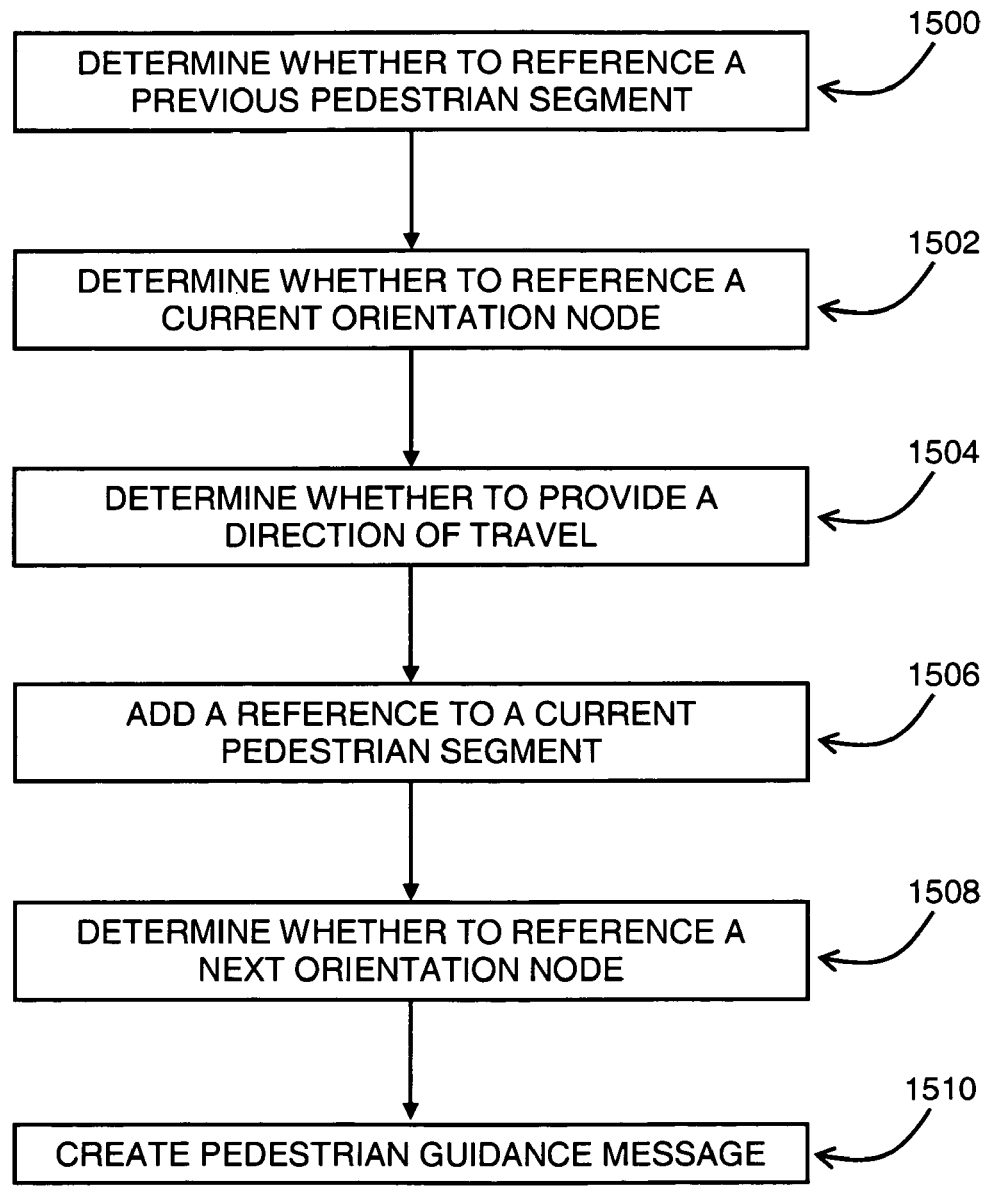
FIG. 15 is a flow chart for creating a pedestrian guidance message, according to an exemplary embodiment.
Figure 16A:
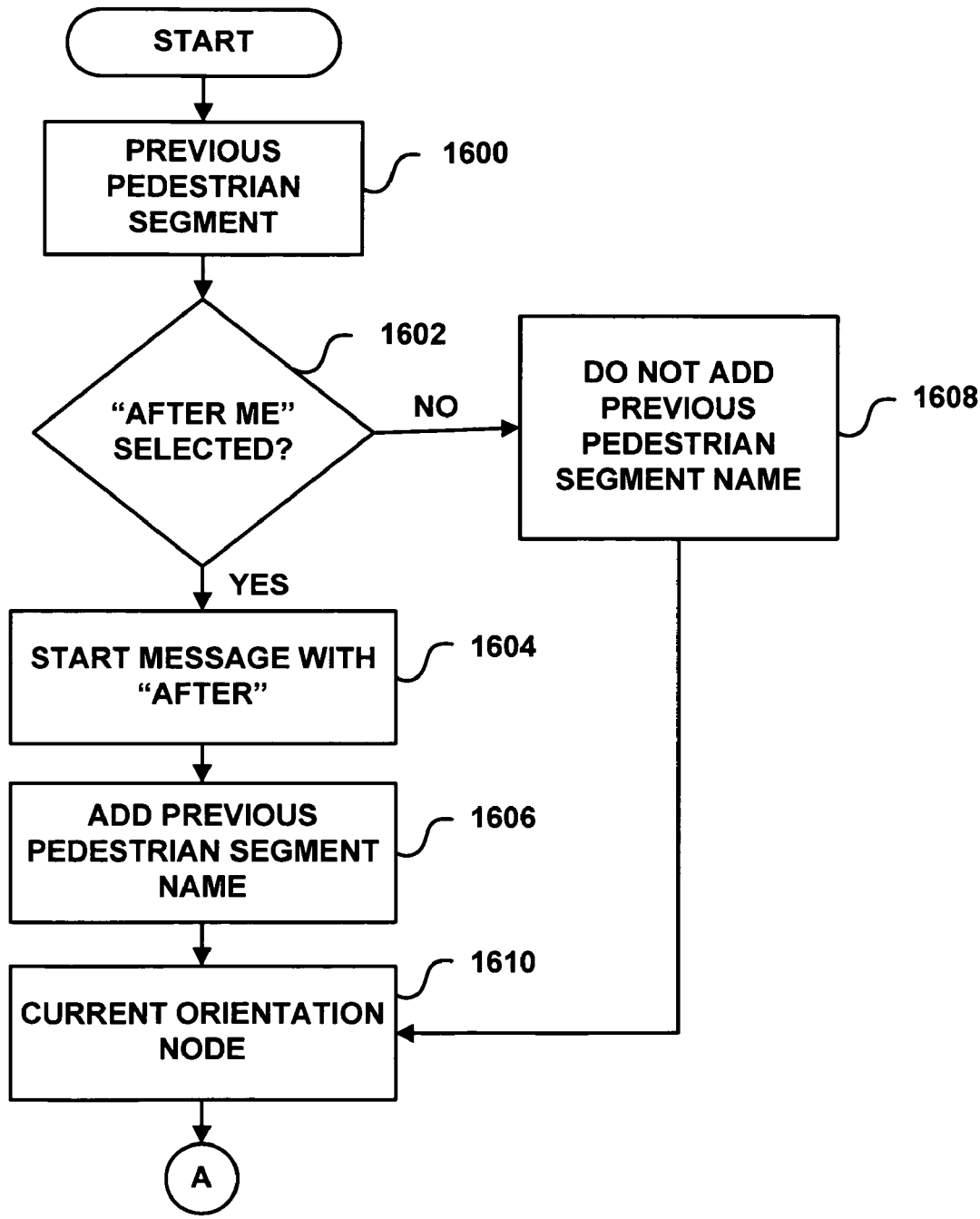
FIGS. 16A-D is a flow chart that depicts a more detailed method of constructing the pedestrian guidance message as the depicted in FIG. 15, according to an exemplary embodiment.
Figure 16B:
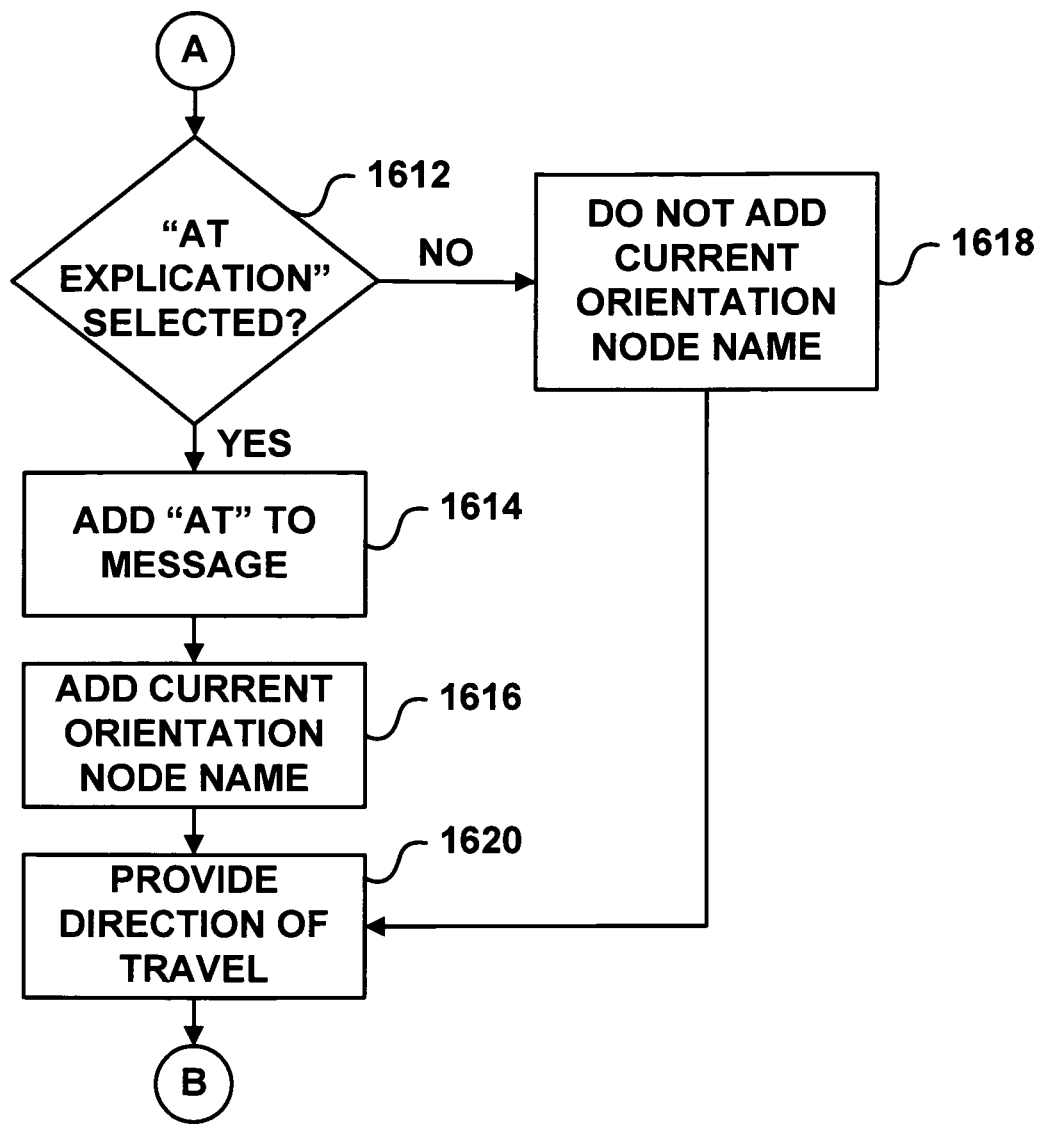
Figure 16C:
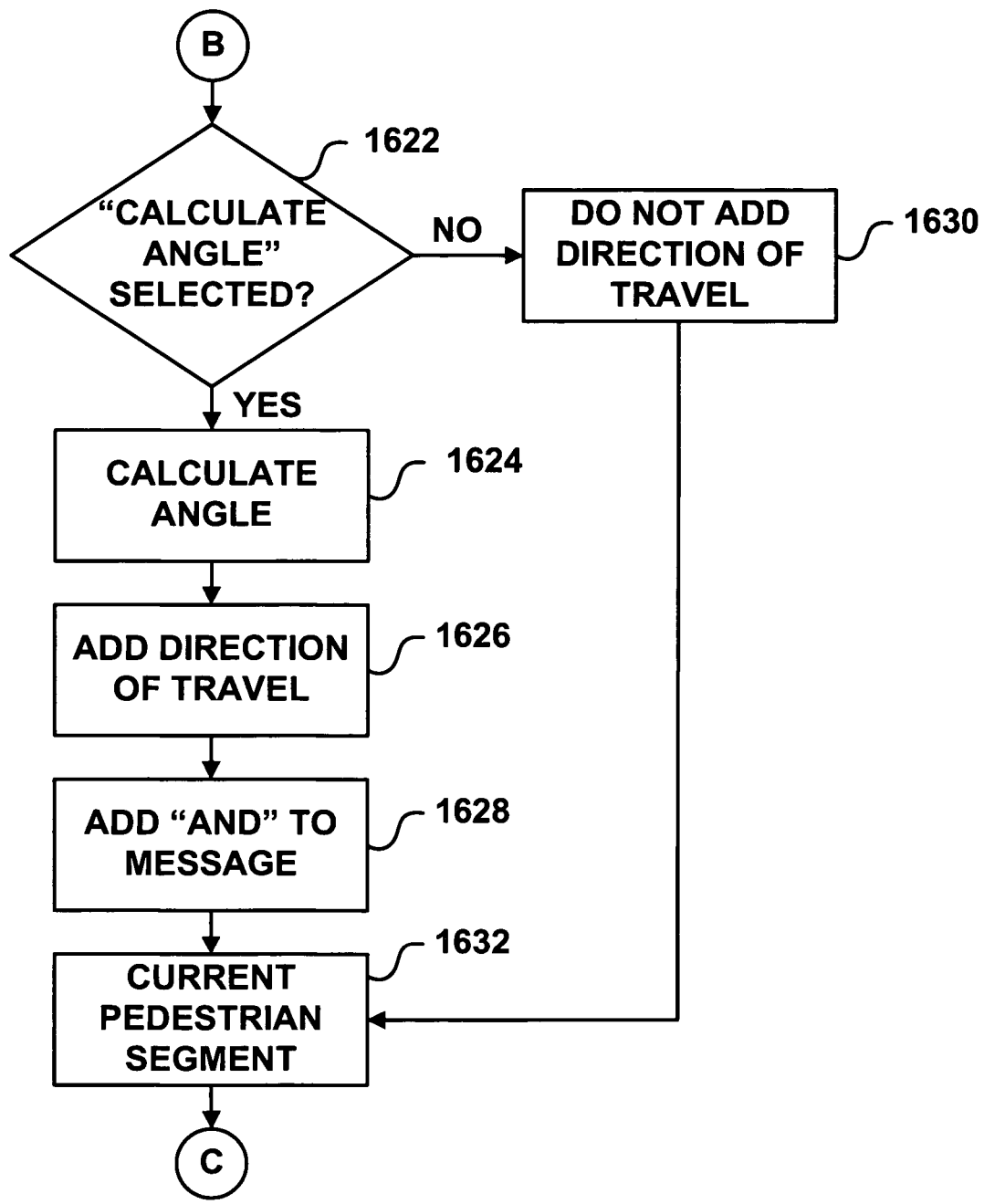
Figure 16D:
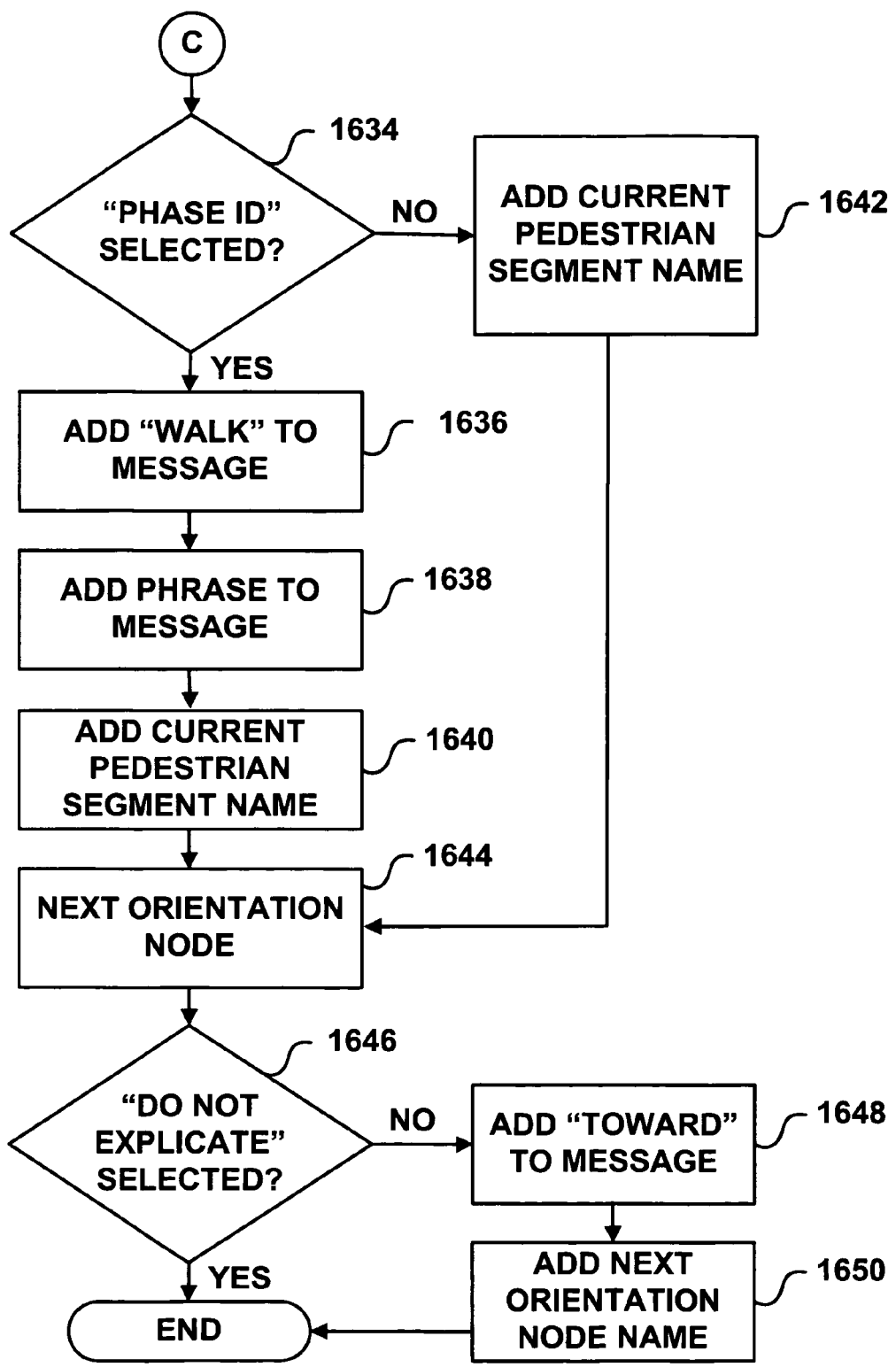

FIG. 15 is a flow chart that depicts the steps performed by the pedestrian guidance function to generate a pedestrian guidance message, according to an exemplary embodiment. At block 1500, the pedestrian guidance function determines whether to reference a previous pedestrian segment. At block 1502, the pedestrian guidance function determines whether to reference a current orientation node. At block 1504, the pedestrian guidance function determines whether to provide a direction of travel. At block 1506, the pedestrian guidance function includes a reference to a current pedestrian segment. At block 1508, the pedestrian guidance function determines whether to reference a next orientation node. At block 1510, the pedestrian guidance message is created based on the determinations performed at blocks 1500-1504, 1508-1510 and the reference to the current pedestrian segment performed at block 1506. The steps performed by the pedestrian guidance function for constructing the pedestrian guidance message are described with more detail with reference to FIGS. 16A-16D.

FIGS. 16A-16D are flow charts that depict a more detailed method of constructing the pedestrian guidance message as specified in FIG. 15, according to an exemplary embodiment. At block 1600, the pedestrian guidance function determines whether the pedestrian guidance message should reference a previous pedestrian segment. Specifically, at block 1602, the pedestrian guidance function obtains the after me data 308(5) in the pedestrian segment data record 308 in the geographic database 116 for the previous pedestrian segment of the ordered list 1400, if any. The after me data may contain a yes or a no. At block 1604, if the after me data of the previous pedestrian segment indicates a yes, then the pedestrian guidance function begins the pedestrian guidance message with the word "after." At block 1606, if the pedestrian guidance message begins with the word "after," the pedestrian guidance function retrieves the name of the previous pedestrian segment from the name data 308(4) of the previous pedestrian segment data record 308 and adds the name to the pedestrian guidance message. A comma is then added to the pedestrian guidance message for grammatical purposes. Otherwise, at block 1608, the pedestrian guidance message does not begin with a reference to the previous pedestrian segment.

At block 1610, the pedestrian guidance function determines whether to reference a current orientation node in the pedestrian guidance message. At block 1612, the pedestrian guidance function obtains the at explication data in the current orientation node data record 310 in the geographic database 116. The at explication data may contain a yes or a no. At block 1614, if the at explication data contains a yes, then the pedestrian guidance function begins or continues the pedestrian guidance message with the word "at." At block 1616, the pedestrian guidance function obtains name of the current orientation node from the orientation node name data for the current orientation node data record and adds the name to the pedestrian guidance message. A comma is then added to the pedestrian guidance message for grammatical purposes. Otherwise, at block 1618, the pedestrian guidance message does not include the name of the current orientation node.

At block 1620, the pedestrian guidance function determinates whether to provide a direction of travel. At block 1622, the pedestrian guidance function checks the calculate angle data in the geographic database 116 for the current orientation node data record. The calculate angle data may be filled with a yes or a no. At block 1624, if the calculate angle data contains a yes, then the pedestrian guidance function calculates an angle between the previous pedestrian segment and the current pedestrian segment. In one embodiment, the magnitude and the direction of the angle between the two pedestrian segments is determined using the angle out data associated with the previous pedestrian segment and the angle in data associated with the current pedestrian segment. The magnitude and direction of the calculated angle is then used to determine which directional text to add to a pedestrian guidance message. For example, if the magnitude of the angle between the two pedestrian segments is less than ten degrees, then a phrase such as "continue straight" may be added to the pedestrian guidance message. As the magnitude of the angle increases, the direction of the angle may be used to determine whether to direct the pedestrian to turn to the left or to the right. Additionally, a phrase indicative of the magnitude of the turn may be added to the message. For example, the word "slight" may be added to the message for smaller angles and the word "sharp" may be added to the message when the angle between the pedestrian segments is large.

After the angle calculation is performed, at block 1626, the pedestrian guidance function adds text describing the direction of travel to the pedestrian guidance message. The text may be chosen based on the magnitude and the direction of the angle. For example, the text may be: turn sharp left, turn left, turn slight left, continue straight, turn slight right, turn right, and turn sharp right. After the directional text is added to the pedestrian guidance message, at block 1628 the pedestrian guidance function includes the word "and" to the pedestrian guidance message. Otherwise, at block 1630, the pedestrian guidance message does not include the direction of travel.

At block 1632, the pedestrian guidance function determines how to reference a current pedestrian segment in the pedestrian guidance. At block 1634, the pedestrian guidance function determines whether the pedestrian segment data record 308 for the current pedestrian segment includes a phrase ID. If a phrase ID exists, at block 1636, the pedestrian guidance function adds the word "walk" to the pedestrian guidance message. At block 1638, the pedestrian guidance function identifies the phrase associated with the pedestrian segment and adds the phrase to the pedestrian guidance message. The phrase ID data represent a number associated with a particular phrase, such as the phrase IDs and corresponding phrases depicted in Table I. At block 1640, the pedestrian guidance function obtains the name of the current pedestrian segment from the name data 308(4) and adds the name to the pedestrian guidance message. Otherwise, at block 1642, the pedestrian guidance message includes only the name of the current pedestrian segment.

At block 1644, the pedestrian guidance function determines whether to reference the next orientation node. At block 1646, the pedestrian guidance function obtains data from the explicate node data record 308(6)(1) of the pedestrian segment data record 308. As illustrated in FIG. 11, the do not explicate reference or non-reference node data may be filled with a yes or a no. At block 1648, if the do not explicate reference or non-reference node data contain a no, then the pedestrian guidance message then includes the word "toward." At block 1650, the word "toward" is followed by the name in the orientation node name record 310(2)(3). Otherwise, the pedestrian guidance message does not include the next orientation node name.

FIGS. 17A and 17B provide two examples of the pedestrian guidance function using information from the geographic database 116 to generate pedestrian guidance messages. In FIG. 17A, example 1, the pedestrian guidance function obtains the illustrated data for the previous pedestrian segment, the current orientation node, the current pedestrian segment and the next orientation node. For example 1, the pedestrian guidance function obtains a no for the after me data of the previous pedestrian segment; a yes for the at explication data, "the statue" for the node name data, and a yes for the calculate angle data of the current orientation node; a "10" (corresponding to "along") for the phrase ID data, "the brick path" for the segment name data, and a no for the do not explicate reference node data of the current pedestrian segment; and "the pond" for the node name of the next orientation node.

Because the after me data contains a no, the pedestrian guidance message does not begin with the word "after" followed by a previous pedestrian segment name. Because the at explication data contains a yes, the pedestrian guidance message begins with the word "at" followed by the name of the current orientation node. A comma may then be added to the introductory phrase for grammatical purposes. Accordingly, the introductory phrase for the pedestrian guidance message in Example 1 is "At the statue."

Continuing with example 1, maneuver text is added to the introductory phrase because the calculate angle data contains a yes. The pedestrian guidance function calculates the angle between the previous pathway segment and the current pathway segment. The magnitude and direction of the angle determines what maneuver text to add to the pedestrian guidance message. In this example, the angle corresponds with the phrase "turn right" which is added to the message. The word "and" is then added to the message after the maneuver text.

Because the phrase ID data is filled with the number 10, the pedestrian guidance message includes the word "walk" followed by the phrase associated with phrase ID 10, which is depicted in Table I as the word "along." The name of the current pedestrian segment "the brick path" is then added to the message.

Because the do not explicate reference node data is filled with a no, the message in Example 1 concludes with the word "toward" followed by the name of the next orientation node, "the pond." As a result, the pedestrian guidance message in example 1 is "At the statue, turn right and walk along the brick path toward the pond."

In FIG. 17B, example 2, the pedestrian guidance function obtains the illustrated data for the previous pedestrian segment, the current orientation node, current pedestrian segment and next orientation node. For example 2, the pedestrian guidance function obtains a no for the after me data of the previous pedestrian segment; a yes for the at explication data, "the fountain" for the node name data, and a no for the calculate angle data of the current orientation node; a "4" (corresponding to "keeping <blank> on your right") for the phrase ID data, "the kayaking course" for the segment name data, and a yes for the do not explicate reference node data of the current pedestrian segment; and "the kayaking course" for the node name of the next orientation node.

Because the after me data contains a no, the pedestrian guidance message does not begin with the word "after" followed by a previous pedestrian segment name. Because the at explication data contains a yes, the pedestrian guidance message begins with the word "at" followed by the name of the current orientation node. A comma may then be added to the introductory phrase for grammatical purposes. Accordingly, the introductory phrase for the pedestrian guidance message in example 2 is "At the fountain."

Continuing with example 2, no maneuver text is added to the introductory phrase because the calculate angle data contains a no. Because the phrase ID data is filled with the number 4, the pedestrian guidance message includes the word "walk" followed by the phrase associated with phrase ID 4, which is depicted in Table I as the phrase "keeping <blank> on your right." The name of the current pedestrian segment "the kayaking course" is then added to the message. Because the do not explicate reference node data is a yes, the message concludes without referencing the name of the next orientation node. As a result, the pedestrian guidance message in example 2 is "At the fountain, walk keeping the kayaking course on your right."

As depicted in FIGS. 17A and 17B, the pedestrian guidance messages initially orient the pedestrian by referencing either an orientation node name or a pedestrian segment name that the pedestrian can currently see (e.g., at the statue, at the fountain). This initial orientation may provide reassurance to the pedestrian that they are starting at the correct location. The pedestrian guidance message may then provide guidance as to how to travel from this starting point, including maneuvers as necessary. In alternative embodiments, the pedestrian receives additional guidance as necessary.

VII. Example of Route Guidance for a Pedestrian

Figure 18A:
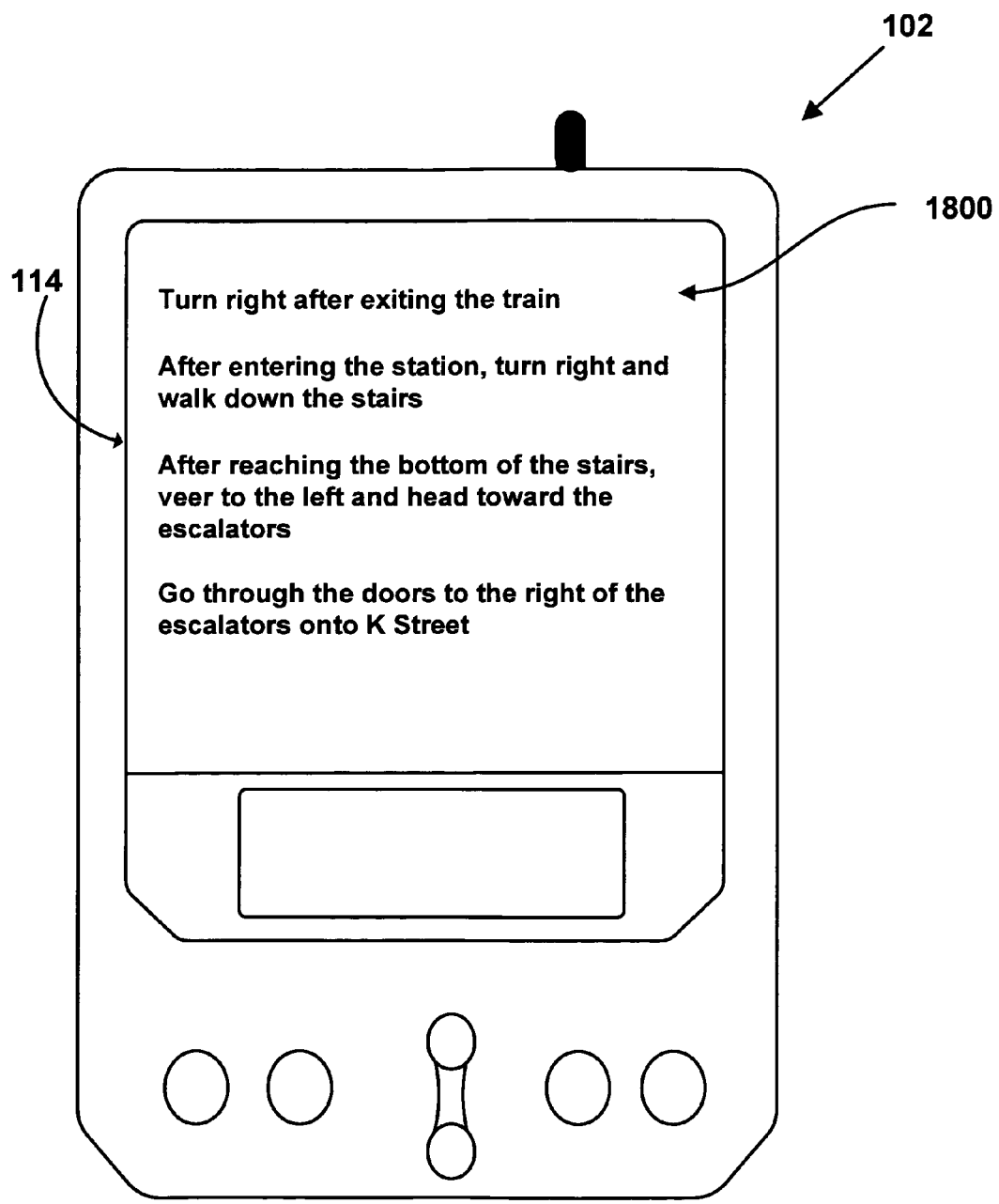
FIGS. 18A, 18B and 18C are screen shots of pedestrian guidance messages a pedestrian may receive using the navigation system of FIG. 1.
Figure 18B:
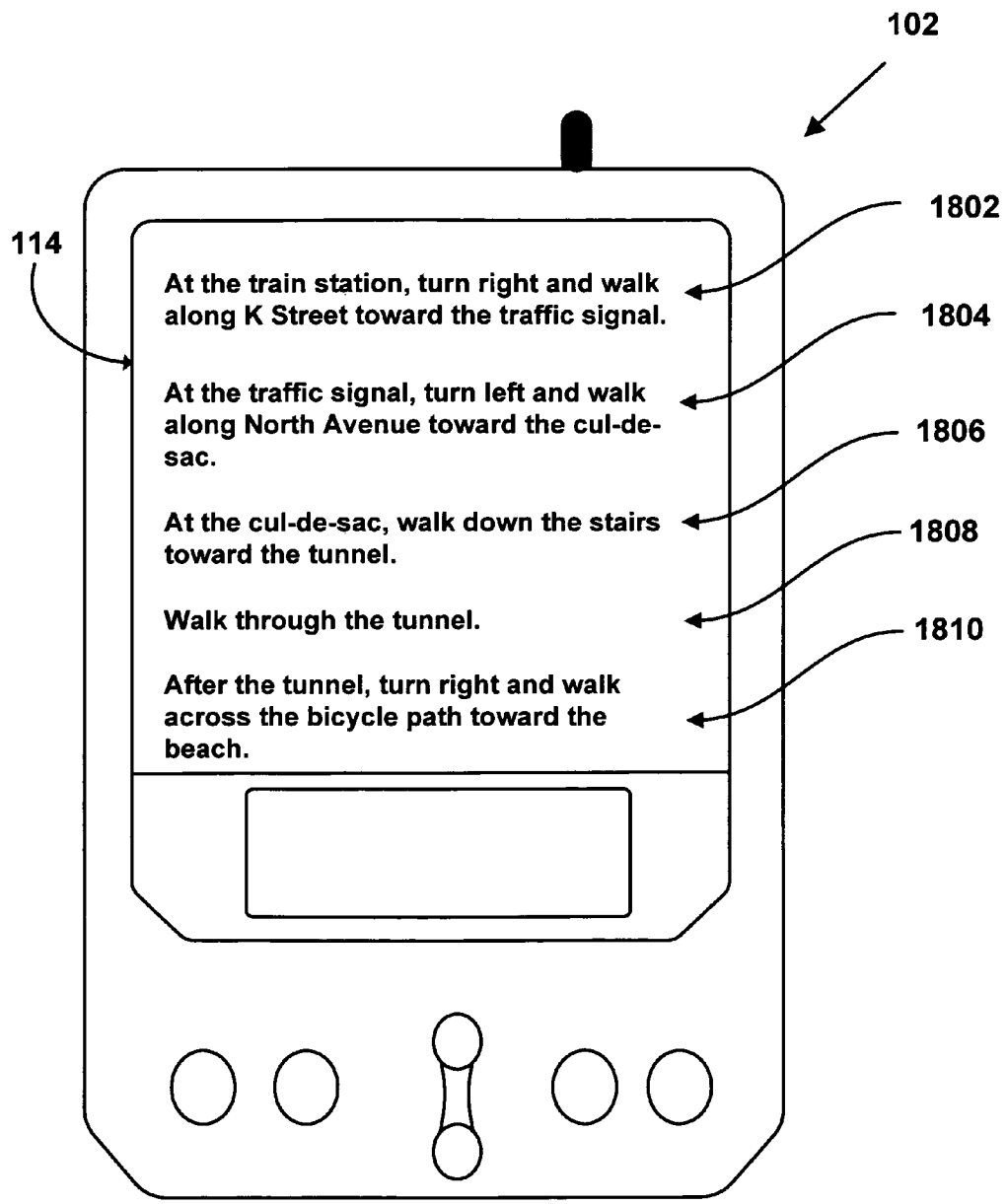
Figure 18C:
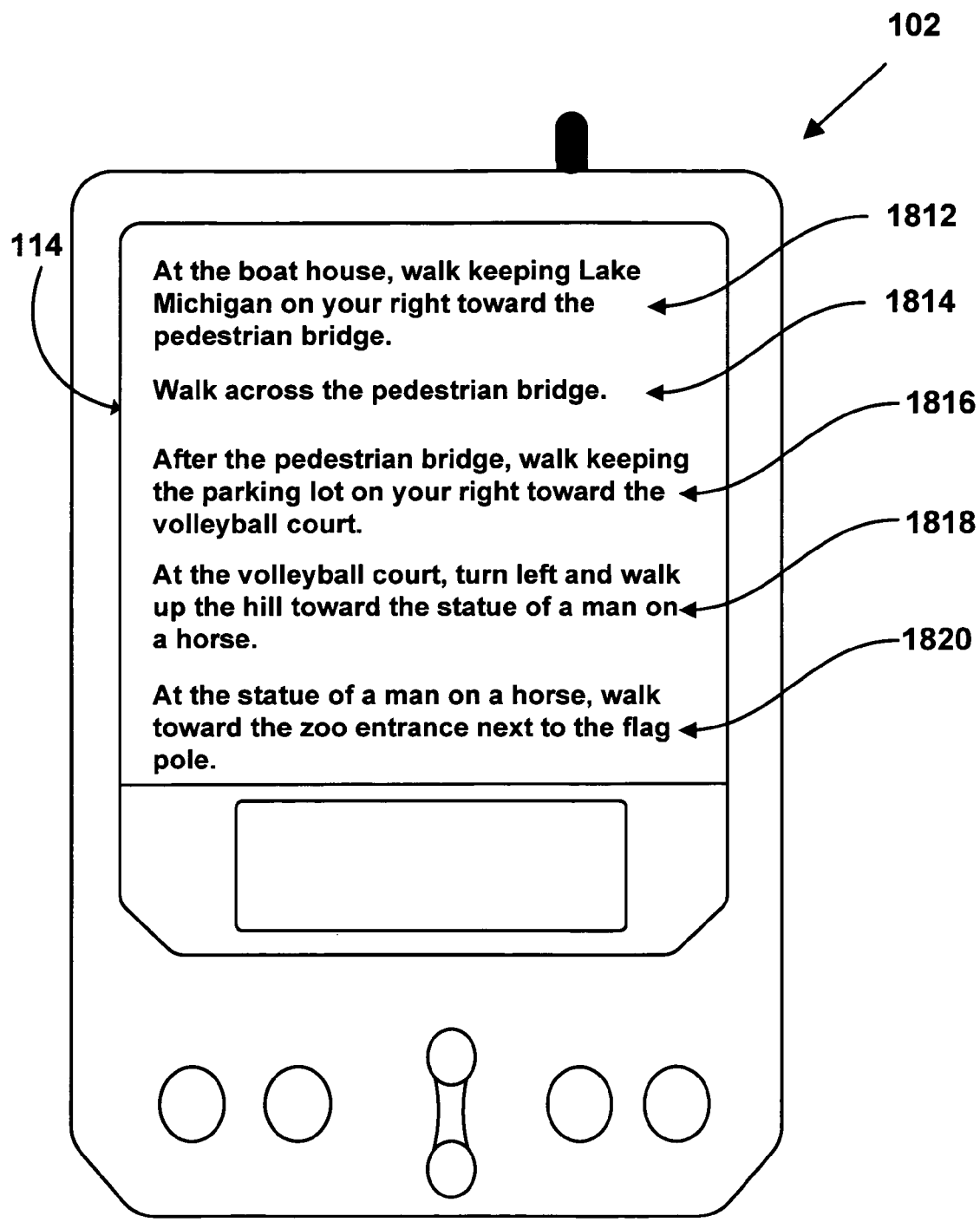

FIGS. 18A, 18B and 18C illustrate examples of a pedestrian guidance messages displayed on the user interface 114 of the computing platform 102. Referring to FIGS. 18A and 18B, the pedestrian is arriving at a train station and wants to walk to the beach. With the user interface 114 of the computing platform 102, the pedestrian enters his or her desired destination of the beach. In one embodiment, the user device determines the pedestrian's origin; alternatively, the pedestrian enters his or her origin of the train station. The navigation system 100 performs the route calculation function 124 in the manner described above using the geographic database with the collected pedestrian data to generate a list of connected pedestrian segments from the train station to the beach. The navigation system then performs the route guidance function 126 in the manner described above using the geographic database 116 with the collected pedestrian data to provide the pedestrian guidance messages illustrated in FIG. 18A.

Referring to FIG. 18A, the user interface 114 displays a first pedestrian guidance message 1800 that provides guidance from the train platform to K Street exit for a train station:

"Turn right after exiting the train. After entering the station, turn right and walk down the stairs. After reaching the bottom of the stairs, veer to the left and head towards the escalators. Go through the doors to the right of the escalators onto K Street."

Referring to FIG. 18B, after the pedestrian has exited the train station, the user interface 114 displays a second pedestrian guidance message 1802 which initially orients the pedestrian by referencing the origin provided by the pedestrian or the user device. The phrase "At the train station" references a readily visible feature, the train station, in close proximity to the pedestrian. The message then describes the second pedestrian segment by directing the pedestrian to "turn right" and walk "along K Street" toward the orientation node referenced with the "traffic signal." Upon reaching the end of the second pedestrian segment of the calculated route, the user interface 114 displays a pedestrian guidance message 1804. The message 1804 orientates the pedestrian and provides a maneuver instruction of "turn left." The message 1804 then describes the third pedestrian segment by directing the pedestrian to walk "along North Avenue" toward the next orientation node referenced with "the cul-de-sac." Upon reaching the end of the third pedestrian segment of the calculated route, the user interface 114 displays a fourth pedestrian guidance message 1806. The message 1806 orientates the pedestrian at the orientation node and describes the fourth pedestrian segment by directing the pedestrian to walk "down the stairs" toward the next orientation node referenced with "the tunnel." Upon reaching the end of the fourth pedestrian segment of the calculated route, the user interface 114 displays a fifth pedestrian guidance message 1808. The message 1808 orientates the pedestrian and describes the fifth pedestrian segment by directing the pedestrian to walk "through the tunnel." Upon reaching the end of the fifth pedestrian segment of the calculated route, the user interface 114 displays a pedestrian guidance message 1810. The message 1810 orientates the pedestrian and provides a maneuver instruction of "turn right." The message 1810 then describes the sixth pedestrian segment by directing the pedestrian to walk "across the bicycle path" toward the next orientation node referenced with "the beach," the pedestrian's desired destination.

Referring to FIG. 18C, the pedestrian is at the beach and wants to walk to the zoo. With the user interface 114 of the computing platform 102, the pedestrian enters his or her desired destination of the zoo. The navigation system 100 performs the route calculation function 124 in the manner described above using the geographic database with the collected pedestrian data to generate a list of connected pedestrian segments from the beach to the zoo. The navigation system then performs the route guidance function 126 in the manner described above using the geographic database 116 with the collected pedestrian data to provide the pedestrian guidance messages illustrated in FIG. 18C.

Referring to FIG. 18C, the user interface 114 displays a first pedestrian guidance message 1812 initially orienting the pedestrian by referencing the origin provided by the pedestrian or the user device. The phrase "At the boat house" references a point of interest, namely a readily visible boat house, in close proximity to the origin of the pedestrian. The message then describes the first pedestrian segment by directing the pedestrian to walk "keeping Lake Michigan on your right" toward the orientation node referenced with the "pedestrian bridge." Upon reaching the end of the first pedestrian segment of the calculated route, the user interface 114 displays a second pedestrian guidance message 1814. The second message 1814 describes the second pedestrian segment by directing the pedestrian to walk "across the pedestrian bridge." Upon reaching the end of the second pedestrian segment of the calculated route, the user interface 114 displays a third pedestrian guidance message 1816. The third message 1816 orientates the pedestrian at the orientation node and describes the third pedestrian segment by directing the pedestrian to walk "keeping the parking lot on your right" toward the next orientation node referenced with "the volleyball court." Upon reaching the end of the third pedestrian segment of the calculated route, the user interface 114 displays a fourth pedestrian guidance message 1818. The fourth message 1818 orientates the pedestrian and provides a maneuver instruction of "turn left." The fourth message then describes the fourth pedestrian segment by directing the pedestrian to walk "up the hill" toward the next orientation node referenced as "the statue of a man on a horse." Upon reaching the end of the fourth pedestrian segment of the calculated route, the user interface 114 displays a fifth pedestrian guidance message 1820. The fifth message 1820 orientates the pedestrian and describes the fifth pedestrian segment by directing the pedestrian to walk "toward the zoo entrance next to the flag pole," the pedestrian's desired destination.

FIGS. 18A, 18B and 18C depict pedestrian guidance messages displayed on the user interface 114 of the computing platform 102; however, the pedestrian guidance messages may be an audio message in another embodiment. Additionally, the computing platform 102 illustrated in FIGS. 18A, 18B and 18C is a PDA; however, other user devices, such as a cellular telephone, may also be used to provide the pedestrian guidance message to the pedestrian. Further, a person may obtain the pedestrian guidance messages prior to walking. For example, a person may get pedestrian guidance messages from an in-vehicle navigation system or a computer, which may be printed and taken with the person to a walking origin location. As yet another example, the pedestrian may obtain pedestrian guidance from a public-access device, such as an Internet web site, a computer terminal, or a kiosk. Additionally, the text in the message may be converted to a voice message using standard text-to-speech techniques.

While the FIGS. 18A, 18B and 18C depict pedestrian guidance messages that a pedestrian may receive from the navigation system 100, the navigation system 100 may also provide additional pedestrian guidance in the form of maps and images. In one embodiment, the navigation system uses the list 1400 of road and/or pedestrian segments to provide a display of a map with a route highlight corresponding to the route. In another embodiment, the navigation system 100 may also provide images of portions of the route. A more detailed description of providing images may be found in the co-pending application Ser. No. 10/880,815 entitled "METHOD OF OPERATING A NAVIGATION SYSTEM USING IMAGES" filed the same date herewith, the entire disclosure of which is incorporated by reference herein. In another embodiment, the pedestrian guidance messages may share the screen with images, or the user device may include a push button selection that allows the pedestrian to toggle between the pedestrian guidance message and the map and/or images. As the pedestrian walks, a pedestrian guidance message, map, and/or images may orient the pedestrian and provide confirmation that the pedestrian is traveling in the correct direction. The type of device that the pedestrian is using to request the pedestrian guidance may determine what type of pedestrian guidance the pedestrian receives. For example, if the pedestrian uses a device that cannot support graphics, the pedestrian may only receive a pedestrian guidance message.

VIII. Further Embodiments

In one embodiment, the pedestrian data discussed above may be used for identifying a user's current location in the absence of a GPS signal and local knowledge of the area. For example, a user unfamiliar with the area may not know street names and street addresses. The following method may be used for origin selection in place of the current position from the GPS positioning system or entry of address or street information. In one embodiment, the user enters a desired destination. Based on a proximity to the destination, such as a typical walking distance for a pedestrian of 2 kilometers, the navigation system 100 presents the user with a series of questions asking if a specific geographic feature is visible from the user's current location, such as "Do you see a harbor?" or "Do you see a Ferris wheel?" The navigation system 100 selects visible features for the questions from the name of the pedestrian segments and orientation nodes in the database 116 proximate the selected destination. When the user answers one of the questions affirmatively, the navigation system 100 focuses the questions to features close to the location of the visible feature to identify the precise segment or node at which the user is located.

Furthermore, although the above description has been describing the navigation features and functions for a pedestrian, any other mode of transportation may also be used, such as motor vehicle, motorcycle, scooter, inline-skates, bicycle or any other. The claims should not be read as limited to the described order or elements unless stated to that effect. All embodiments that come within the scope and spirit of the following claims and equivalents thereto are claimed as the invention.

We claim:

1. A computer implemented method of collecting data for a geographic database for use with a navigation system comprising:

identifying a pedestrian segment for travel by a pedestrian;

collecting location information for said pedestrian segment;

collecting lighting level attribute information for said pedestrian segment; and storing data representing the location data and the lighting level attribute information in said geographic database, wherein said geographic database is stored on a computer readable data storage medium.

2. The method of claim 1 further comprising:
identifying a pair of nodes as endpoints of said pedestrian segment.

3. The method of claim 1 further comprising:
collecting a travel distance along the pedestrian segment.

4. The method of claim 1 further comprising:
collecting data indicating the proximity of the pedestrian segment to a road.

5. The method of claim 1 wherein the collecting location data is performed by a geographic researcher traveling in a geographic region.

6. The method of claim 5 wherein the geographic researcher captures images of the geographic region.

7. The method of claim 1 wherein the collecting location data is performed by analyzing an aerial image.

8. A computer implemented method of collecting data for a geographic database comprising:
   identifying a pedestrian segment for travel by a pedestrian;
   collecting location information for said pedestrian segment;
   collecting attribute information for said pedestrian segment indicating wheel-chair accessibility; and
   storing data representing the location data and the attribute information in said geographic database, wherein said geographic database is stored on a computer readable data storage medium.

9. The method of claim 8 wherein attribute information for said pedestrian segment indicating wheel-chair accessibility indicates a curb cutout associated with the pedestrian segment.

10. The method of claim 8 wherein attribute information for said pedestrian segment indicating wheel-chair accessibility indicates a pavement type of the pedestrian segment.

11. The method of claim 8 wherein attribute information for said pedestrian segment indicating wheel-chair accessibility indicates stairs associated with the pedestrian segment.

12. The method of claim 8 wherein attribute information for said pedestrian segment indicating wheel-chair accessibility indicates elevator associated with the pedestrian segment.

13. The method of claim 8 wherein attribute information for said pedestrian segment indicating wheel-chair accessibility indicates a cross-walk associated with the pedestrian segment.

14. A geographic database that represents features in a geographic region, said geographic database comprising:
   data representing a pedestrian path in said geographic region, wherein said data representing said pedestrian path comprising:
   data representing location of said pedestrian path; and
   data representing lighting level for said pedestrian path; wherein said geographic database is stored on a computer readable medium.

15. A geographic database that represents features in a geographic region, said geographic database comprising:
   data representing a pedestrian path in said geographic region, wherein said data representing said pedestrian path comprising:
   data representing location of said pedestrian path; and
   data representing wheel-chair accessibility for said pedestrian path; wherein said geographic database is stored on a computer readable medium.

16. The geographic database of claim 15 wherein said wheel-chair accessibility indicates a curb cutout associated with the pedestrian segment.

17. The geographic database of claim 15 wherein said wheel-chair accessibility indicates a pavement type of the pedestrian segment.

18. The geographic database of claim 15 wherein said wheel-chair accessibility indicates stairs associated with the pedestrian segment.

19. The geographic database of claim 15 wherein said wheel-chair accessibility indicates elevator associated with the pedestrian segment.

20. The geographic database of claim 15 wherein said wheel-chair accessibility indicates a cross-walk associated with the pedestrian segment.

\* \* \* \* \*